(12) United States Patent
Tammaji et al.

(10) Patent No.: US 9,221,971 B2
(45) Date of Patent: Dec. 29, 2015

(54) POLYESTER RESIN COMPOSITION AND A PROCESS FOR MANUFACTURING THE SAME

(76) Inventors: Kulkarni Sanjay Tammaji, Pune (IN); Akhilesh Vijra, Pune (IN); Vyas Chandrakant Onkar, Pune (IN); Albert Luckyto Soekarno, Shanghai (CN); Roelof Van Der Meer, Halsteren (NL); Simone Schillo, Ludwigshafen (DE)

( * ) Notice: Subject to any disclaimer, the term of this patent is extended or adjusted under 35 U.S.C. 154(b) by 187 days.

(21) Appl. No.: 13/810,042

(22) PCT Filed: Jun. 24, 2011

(86) PCT No.: PCT/IN2011/000425
§ 371 (c)(1),
(2), (4) Date: Jan. 14, 2013

(87) PCT Pub. No.: WO2012/007958
PCT Pub. Date: Jan. 19, 2012

(65) Prior Publication Data
US 2013/0115402 A1    May 9, 2013

(30) Foreign Application Priority Data

Jul. 14, 2010 (IN) .......................... 2020/MUM/2010

(51) Int. Cl.
*B32B 1/02* (2006.01)
*C08L 67/02* (2006.01)
*C08G 63/183* (2006.01)
(Continued)

(52) U.S. Cl.
CPC . *C08L 67/02* (2013.01); *B32B 1/02* (2013.01); *C08G 63/183* (2013.01); *C08G 63/80* (2013.01); *C08G 63/916* (2013.01); *Y10T 428/1397* (2015.01)

(58) Field of Classification Search
CPC ........ B32B 1/02; C08G 63/02; C08G 63/183; C08G 63/80; C08G 63/916; Y10T 428/1397; C08L 67/02
USPC ................... 428/34.1, 34.2, 35.7, 35.9, 36.92
See application file for complete search history.

(56) References Cited

U.S. PATENT DOCUMENTS

| | | | |
|---|---|---|---|
| 4,161,579 A | 7/1979 | Edelman et al. | |
| 4,219,527 A | 8/1980 | Edelman et al. | ............. 264/540 |

(Continued)

FOREIGN PATENT DOCUMENTS

| | | |
|---|---|---|
| AU | 2010 101182 | 12/2010 |
| JP | 54-137095 A | 10/1979 |

(Continued)

OTHER PUBLICATIONS

International Search Report Issued Dec. 1, 2011 in PCT/IN11/000425 Filed Jun. 24, 2011.

(Continued)

*Primary Examiner* — Marc Patterson
(74) *Attorney, Agent, or Firm* — Oblon, McClelland, Maier & Neustadt, L.L.P.

(57) ABSTRACT

Co-polyester resin compositions and processes for manufacturing resin compositions are provided, said resin compositions being suitable for extrusion blow molding for the manufacture of containers with good color, clarity for both food, non-food applications and other applications such as profile extrusions and manufacture of blown films which require high melt strength polyester.

33 Claims, 6 Drawing Sheets

(51) Int. Cl.
*C08G 63/80* (2006.01)
*C08G 63/91* (2006.01)
*B32B 1/08* (2006.01)

(56) References Cited

U.S. PATENT DOCUMENTS

| | | | |
|---|---|---|---|
| 4,554,329 A | 11/1985 | Sinker et al. | |
| 5,412,063 A | 5/1995 | Duh et al. | |
| 5,523,135 A | 6/1996 | Shiwaku et al. | 428/35.7 |
| 5,523,382 A | 6/1996 | Beavers et al. | 528/296 |
| 5,686,553 A | 11/1997 | Tai et al. | |
| 6,376,624 B1* | 4/2002 | Kao et al. | 525/438 |
| 6,447,711 B1 | 9/2002 | Al Ghatta et al. | |
| 6,984,694 B2 | 1/2006 | Blasius, Jr. et al. | 525/148 |
| 7,358,322 B2* | 4/2008 | Jernigan et al. | 528/271 |
| 2003/0134915 A1 | 7/2003 | Scantlebury et al. | 521/48 |
| 2004/0138381 A1* | 7/2004 | Blasius et al. | 525/131 |
| 2005/0176920 A1* | 8/2005 | Caldwell | 528/272 |
| 2006/0211829 A1* | 9/2006 | Studholme et al. | 525/403 |
| 2006/0293493 A1* | 12/2006 | Kulkarni et al. | 528/277 |
| 2007/0203253 A1* | 8/2007 | Agarwal et al. | 521/48 |
| 2008/0093777 A1 | 4/2008 | Sequeira et al. | 264/510 |
| 2009/0264545 A1 | 10/2009 | Sequeira | 521/48 |
| 2010/0015872 A1* | 1/2010 | Kim et al. | 442/141 |
| 2010/0201015 A1 | 8/2010 | Fujimaki et al. | |
| 2013/0214455 A1 | 8/2013 | Siegenthaler et al. | |

FOREIGN PATENT DOCUMENTS

| | | |
|---|---|---|
| JP | 61-181823 A | 8/1986 |
| JP | 9-503805 A | 4/1997 |
| JP | 9-118744 A | 5/1997 |
| JP | 9-136945 A | 5/1997 |
| JP | 2009-528395 A | 8/2009 |
| WO | 03 051958 | 6/2003 |
| WO | WO 2007/089748 A2 | 8/2007 |
| WO | WO 2009/004745 A1 | 1/2009 |
| WO | 2009 129469 | 10/2009 |
| WO | WO 2010/034711 A1 | 4/2010 |

OTHER PUBLICATIONS

Office Action issued Feb. 10, 2015 in Chinese Patent Application No. 201180034694.5.

Office Action issued May 13, 2014 in Chinese Patent Application No. 201180034694.5 (submitting English translation only).

Office Action issued Dec. 8, 2014 in Japanese Patent Application No. 2013-519218 (submitting English translation only).

* cited by examiner

POLYESTER RESIN COMPOSITION AND A PROCESS FOR MANUFACTURING THE SAME

FIELD OF THE INVENTION

The present invention relates to co-polyester resin compositions and processes for manufacturing resin compositions, said resin compositions being suitable for extrusion blow molding for the manufacture of containers with good color, clarity for both food, non-food applications and other applications such as profile extrusions and manufacture of blown films which require high melt strength polyester.

BACKGROUND

Extrusion blow molding (EBM) is a well known manufacturing process used for producing hollow parts/bottles/containers from a plastic material. In EBM process, the polymer is melted and extruded into a hollow tube (a parison) and subsequently blow molded in containers of various sizes and shapes. The technology of machine and design as well as processing is quite advanced and matured.

The polymers that are currently used in EBM application include polyethylene, polypropylene, SBC, and PETG. For a polymer to be processed in a typical EBM application it must have the requisite melt strength. Furthermore, the polymer must also possess good stretch-ability in order to make a container of any design. For bottles/containers in packaging application, color and clarity (transparency) are also important characteristics.

PET polyester possesses many of the desirable properties that are required for design and development of wide variety of packaging materials which also include bottles and container for food grade and non food grade items. For example, PET polyester is lighter in weight, unbreakable, transparent, recyclable and it also possesses high gas barrier properties. Furthermore, PET has been widely approved worldwide for packaging food grade items by many regulatory agencies. Because of all these reasons, there is a lot of market potential for PET polyester that is suitable for EBM application. In packaging applications colour and clarity (i.e. transparency) are also the most important desired characteristics.

However, unlike the other polymers mentioned herein above, PET polyester as such can not be used for EBM application, on account of its low melt-strength. High melt strength is required to get required molten polymer flow like a hollow tube in the extrusion process i.e. parison & subsequently blow the parison where polymer is still in the molten state. Besides melt strength, a good stretchability is another important property of the polymer for manufacturing a bottle or a container of any design. When it comes to subjecting a PET polyester to extrusion blow molding for preparation of bottles and container, it has a severe shortcoming. Because of its poor melt strength, conventional PET polyester is not suitable for Extrusion Blow Molding. Attempts have been made to overcome this shortcoming by modifying the PET polyester so as to make it suitable for EBM applications. Also colour and clarity of bottles are important required characteristics in packaging application. Following Patents/applications disclose several methods of preparation of polyester resin compositions that claim suitability of PET for EBM application.

U.S. Pat. No. 4,219,527 discloses a process for blow molding a modified polyethylene terephthalate polymer. U.S. Pat. No. 4,219,527 is particularly silent over the use of chain extending agents for modifying the PET polymer. Furthermore, it is also silent as far as clarity, color and acetaldehyde content of the modified PET polymer is concerned.

US Patent Application no 20080093777 discloses extrudable PET blends using chain extenders during extrusion process of EBM which employs a slow crystallizing polyester copolymer. Also, it is not possible to ensure proper uniform melt quality as the residence time in the extruders is very short to ensure uniform mixing without polymer degradations. One would also need blending equipments on every EBM machine.

Another U.S. Pat. No. 5,523,135 is based on mechanical blending of styrenic copolymer and glycidyl esters of unsaturated acids and vinylic co monomers. This is again a complicated blending process which not only seriously affects colour and clarity but also creates non uniform polymer quality and non uniform melt strength. Furthermore, the process as taught in U.S. Pat. No. 5,523,135 needs additional equipments. U.S. Pat. No. 5,523,135 discloses a process for production of PET in which pre-polymerised PET with a high molecular weight is used in a blending or compounding step. The person skilled in the art would not take into account adding a chain extender into a reaction mixture containing phthalic acid and ethylene glycol due to the high concentration of reactive carboxylic acid groups which the person skilled in the art expects to react immediately with the chain extender. Hence, the teaching of U.S. Pat. No. 5,523,135 is restricted to production of PET by using a chain extender in the melt blending or compounding stage, only. There is no indication that reacting the chain extender prior to the polymerization of the PET is a suitable way to produce PET suitable for an EBM process.

U.S. Pat. No. 5,523,382 discloses process for producing polyester adapted to be extrusion blow molded into articles having improved rheological qualities, that employs 1,4-cyclohexanedimethanol for modifying the properties of the polyester.

U.S. Pat. No. 6,984,694 explains the use of chain extenders to improve properties of virgin, recycled and reprocessed condensation polymers. The process mainly describes the use of the chain extender with various polymers by compounding.

The prior art patents disclosed herein above make use of chain extender by compounding the same with the polymers. When it comes to the manufacture of EBM grade polyester, the conventional method of incorporation of the additives through compounding suffers from several shortcomings. For example, incorporation of the chain extender in the polymer by compounding often leads to the development of formation of gel particles in the polymer melt. Furthermore, color and clarity of the polymer gets deteriorated and still furthermore, impact strength and thermal stability of the polymer also gets seriously affected. An additional process step and additional equipment is needed to conduct chain extension via reactive extrusion of the polymer. In many case, a small portion of chain extenders are sufficient to increase the melt strength, however, direct dosing of small quantities of a reactive additive system is very difficult to do in practice and a masterbatch of the chain extender has to be produced prior to be used in reactive extrusion. The current invention overcomes all this additional costs and process steps.

There is therefore, exists a need for a gel-free PET Polyester composition with high melt strength that has high clarity, better color and gloss, improved drawability and requisite impact strength. It is also desirable at the same time that such co-polyester should also be recyclable, and can be directly used by existing EBM machines without need of any additional process such as blending/compounding.

Objects of the Invention

It is an object of the present invention to provide a co-polyester resin, having high melt strength that is suitable for extrusion blow molding.

It is another object of this invention to provide an extrusion-blow moldable polyester that is gel-free.

It is yet another object of this invention to provide an extrusion-blow moldable polyester that has good clarity i.e. low haze, high gloss, good colour, free from any yellow tinge and improved stretch-ability.

It is yet another object of this invention to provide an extrusion-blow moldable polyester that has low acetaldehyde content.

It is a further object of this invention to provide a shaped article formed from the extrusion-blow moldable polyester.

It is a still further object of this invention to provide a process for preparation of an extrusion-blow moldable polyester.

It is a still further object of this invention to provide a process for preparation of an extrusion-blow moldable polyester which employs recycled PET feedstock.

It is a still further object of this invention to provide an extrusion blow moldable polyester which employs biobased ethylene glycol.

It is a still further object of this invention to provide a process for preparation of polyester that can be directly used for the application such as Extrusion Blow Molding without any additional process of blending/compounding with any additives.

It is another object of the present invention to provide an extrusion-blow moldable polyester which is useful for both food and non-food applications.

SUMMARY OF THE INVENTION

In one aspect of the present invention, there is provided a process for preparation of an extrusion-blow-moldable co-polyester resin composition; said process comprising the following steps:

a. charging in a reactor at least one pair of polyester-forming materials selected from the group of pairs consisting of a 'diol-dicarboxylic acid' pair, a 'diol-dicarboxylic ester' pair and a diol-recycled PET pair, along with a co-monomer and optional at least one additive selected from the group consisting of an impact modifier, an antioxidant, a catalyst, an acetaldehyde inhibitor and a color toner, to obtain a reaction mixture;

b. subjecting the reaction mixture to a method step selected from the group consisting of esterification, ester-interchange reaction and glycolysation yielding a pre-polymer;

c. charging a chain extender, in a proportion of about 0.05 wt. % to about 2.0 wt. %, preferably about 0.05 wt. % to about 0.8 wt. %, more preferably 0.05 wt % to 0.40 wt. % in the reaction mixture during step (b) in at least one portion or in continuous manner at controlled dosing rate when the intrinsic viscosity of the reaction mixture is <0.20, preferably <0.10;

d. subjecting the pre-polymer to polycondensation at a temperature in the range of about 270° C. to about 305° C. under pressure of less than 10 mb, preferably below 2 mb, more preferably below 1 mb to obtain amorphous chips of I.V in range 0.40 to 0.80;

e. crystallizing the amorphous chips at a temperature in the range of about 110° C.-170° C. to obtain chips with a crystallinity of more than 30%; and f. processing the crystallized chips in a Solid State Polymerizer at a temperature in the range of about 190° C. to about 225° C. till the required I.V of about 0.70 to about 2.0, preferably about 0.90 to about 1.50, more preferably about 0.90 to about 1.40 is achieved to obtain an EBM grade co-polyester resin composition.

"Pre-polymer" means a polyester formed in the reaction as long as its intrinsic viscosity is <0.20.

Typically, the diol is at least one selected from the group consisting of monoethylene glycol, diethylene glycol, triethylene glycol, butanediol, propanediol, and polyethylene glycols with a weight average molecular weight of up to 4000 g/mol, proportion of polyethylene glycol in said mixture being up to 5% with respect to the mass of the total mixture. Monoethylene glycol is especially preferred.

Typically, the 'diol-dicarboxylic acid' pair is used as the polyester-forming material.

Typically, the di-carboxylic acid is at least one selected from the group consisting of purified terephthalic acid, isophthalic acid, adipic acid and sebacic acid.

Preferably, the di-carboxylic acid is purified terephthalic acid.

In accordance with one of the embodiments the 'diol-dicarboxylic acid' pair is used as the polyester-forming material and wherein the esterification step b) is carried out at a temperature in the range of about 200 to 300° C., preferably 220 to 280° C. and very preferably 240 to about 280° C. under the pressure up to about 4.5 bar for a period of about 1 to 10 hrs, preferably 1.5 to 6 hrs and very preferably 2.0 to 2.5 hrs.

Typically, the molar ratio of the diol and the di-carboxylic acid in the diol-dicarboxylic acid pair is in the range of about 1.04 to about 1.45.

In accordance with another embodiment of the present invention the 'diol-dicarboxylic ester' pair is used as the polyester-forming material and wherein the dicarboxylic ester is dimethyl terephthalate.

Typically, the molar ratio of diol and the dimethyl terephthalate in the 'diol-dicarboxylic ester' pair is in the range of about 2 to about 2.25.

Typically, the dicarboxylic ester is dimethyl terephthalate and the ester-interchange reaction is carried out at a temperature in the range of about 140° C. to about 270° C. under absolute pressure of about 200 mbar to about 1200 mbar, preferably about 500 mbar to about 1100 mbar for a period of about 30 minutes to 3 hrs.

Typically, the co-monomer is at least one selected from the group consisting of isophthalic acid, neopentyl glycol, pentaerythitol, glycerol, adipic acid, 2,6 Naphthalene Dicarboxylate (NDC), 2,6-Naphthalene dicarboxylic acid (NDA), dimethyl isophthalate Pentaerythritol and Glycerol.

Typically, the 'diol-dicarboxylic ester' pair is used as the polyester-forming material and wherein the co-monomer is dimethyl isophthalate.

Typically, the proportion of the co-monomer with respect to the mass of the reaction mixture is in the range of about 4 to about 20%, preferably about 6 to 15%, more preferably in the range of about 8 to 12%.

In accordance with still another embodiment of the present invention the 'diol-recycled PET' pair is used as the polyester-forming material and wherein the glycolysation step is carried out at a temperature in the range of about 190 to about 260° C. under the pressure up to about 3.5 bar for a period of about 30-120 minutes, preferably 40 to 60 minutes yielding a pre-polymer.

Typically, the catalyst is selected from the group consisting of poly-condensation catalyst and ester-interchange catalyst.

Typically, the catalyst is at least one poly-condensation catalyst selected from the group consisting of Antimony compounds, Germanium compounds, Titanium compounds, Tin compounds and Aluminium compounds.

Typically, the catalyst is at least one ester-interchange catalyst is selected from the group consisting of zinc acetate and manganese acetate.

Typically, the color toner is at least one selected from the group consisting of cobalt acetate and polymer soluble dyes.

Typically, the chain extender is at least one copolymer containing at least in average two epoxy groups/polymer chain and a number average molecular weight of the chain extender $M_n$ in the range from 1000 to 10000 Dalton.

Typically, the chain extender is at least one copolymer having an epoxy equivalent weight in the range of 150 to 700.

Typically, the chain extender is charged in the form of a pre-mix comprising the chain extender and a carrier selected from the group consisting of powdered PET and powdered Co-PET.

Typically, the stabilizer is at least one aliphatic phosphate selected from the group consisting of carboxy ethyl dimethyl phosphate and phosphoric acid.

Typically, the grade of the co-polyester resin is adjusted by varying the proportion of the chain extender that is added in the reaction mixture.

Typically, the acetaldehyde (AA) content of the polyester resin is less than 10 ppm, preferably less than 5 ppm, very preferably less than 3 and especially preferably less than 1 ppm at the end of step e).

It is an advantage of the present invention that adding the chain extender to steps a and/or b according to the invention results in shorter reaction times for achieving a certain molecular weight compared with a process without a chain extender. The less the reaction time is the less the product obtained is subjected to thermal stress and therefore yields less acetaldehyde.

Typically, the amorphous chips are crystallized in equipment selected from the group consisting of tumble dryer, rotary crystallizer and high rpm agitated reactor (solidaire).

Typically, the method step (f) is carried out in a reactor selected from the group consisting of batch reactor and continuous reactor.

Typically, the recycled PET is at least one selected from the group consisting of post consumer recycled PET and post industrial recycled PET.

In accordance with one of the embodiments of the present invention there is provided a process for preparation of co-polyester resin composition wherein the proportion of the chain extender is about 0.05 wt. % to about 2.0 wt. %, preferably about 0.05 wt. % to about 0.8%, more preferably 0.05 wt. % to 0.4 wt. % with respect to the mass of the reaction mixture and the EBM-grade co-polyester resin composition obtained has intrinsic viscosity in the range of about 0.80 to about 1.40 and is gel free and transparent.

In accordance with another aspect of the present invention there is an extrusion-blow-moldable co-polyester resin composition with intrinsic viscosity in the range of about 0.70 to about 2.0 which includes a chain extender in the proportion of about 0.05% to about 2.0% with respect to the mass of the resin added before polymerization in at least one portion or in continuous manner at controlled dosing rate when the intrinsic viscosity of the reaction mixture is <0.20, preferably <0.10.

The chain extender may be added in at least two portions, preferably in at least three portions, very preferably in at least four portions, and especially in a continuous manner and at a controlled dosing rate.

The portions may be of equal or different size, preferably of equal size.

Typically, the melt strength of the co-polyester at a temperature of 260° C. to 275° C. is in the range of about 0.05 N to 0.5 N, preferably 0.08 N to 0.25 N and the haul-off speed is in the range of about 20 m/min to 180 m/min, preferably about 60 m/min to 160 m/min.

Typically, the extrusion-blow-moldable co-polyester resin composition is characterized by L* transmission value >92.0%, a* color value of between −1.0±0.5 and b* color value of between 0.3±0.5 as classified by the Hunter L*a*b* color space.

In accordance with another aspect of the present invention there is provided an extrusion-blow-molded shaped article optionally having an integral hollow handle formed from the co-polyester resin composition of the present invention.

Typically, the shaped article is at least one article selected from the group consisting of a parison, a container, a film and a tube.

Typically, the volume of the shaped article is in the range of about 20 ml to about 25 liters for food and nonfood applications In accordance with one of the embodiments of the present invention the extrusion-blow-molded shaped article formed from the co-polyester resin composition is transparent.

BRIEF DESCRIPTION OF THE DRAWINGS

The invention will now be described with reference to accompanying drawing.

DETAILED DESCRIPTION

Figure 3:
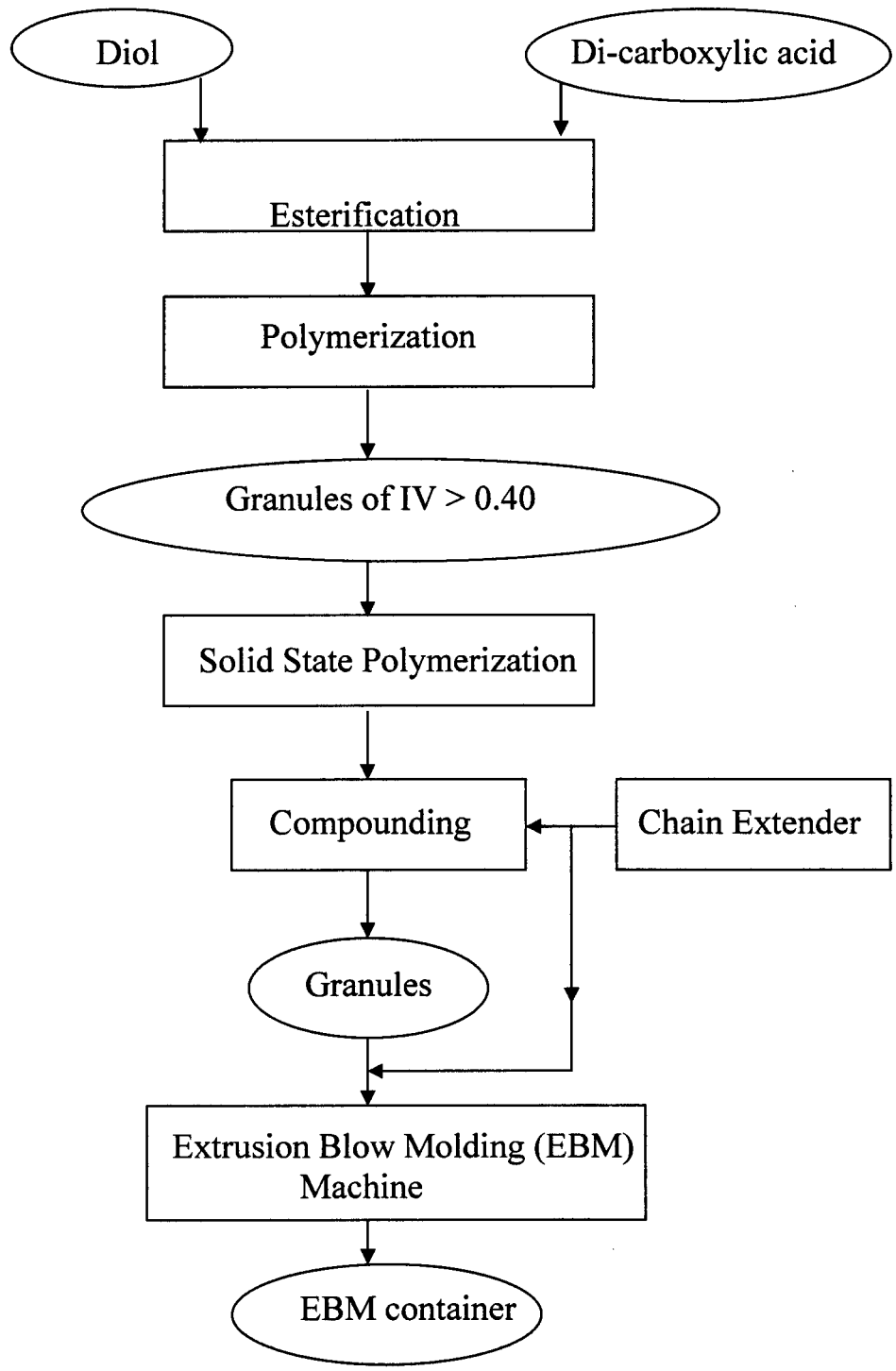
FIG. 3: Flow chart illustration of the prior art process which employs compounding

The known methods for manufacturing EBM grade polyester employ the compounding approach for incorporation of various additives along with the polyester wherein the chain extender is introduced in the polyester only after solid state polymerization when the intrinsic viscosity of the polyester is more than 0.55. The known process is illustrated by a flowchart in FIG. 3. However, the known process suffers from a severe shortcoming, i.e formation of gel particles in the resultant polyester. This in turn also adversely affects the color and clarity of the final product.

In the present invention, there is provided a process for preparation of an extrusion blow moldable co-polyester resin wherein a chain extending agent is incorporated during the formation of the co-polyester resin itself. Unlike, the process of compounding, in the process of the present invention, the chain extending agent is introduced during the monomer formation & oligomer or pre-polymer formation in the reaction mixture, when the viscosity of the reaction mixture is very low, particularly below 0.2 and preferably less than 0.1.

In accordance with a first aspect of the present invention, there is provided a process for preparation of an extrusion-blow-moldable co-polyester resin composition; said process comprising the following steps:

a. charging in a reactor at least one pair of polyester-forming materials selected from the group of pairs consisting of a 'diol-dicarboxylic acid' pair, a 'diol-dicarboxylic ester' pair and 'diol-recycled PET pair, along with a co-monomer and at least one additive selected from the group consisting of an impact modifier, an antioxidant, a catalyst, an acetaldehyde inhibitor and a color toner, to obtain a reaction mixture;

b. subjecting the reaction mixture to a method step selected from the group consisting of esterification, ester-interchange reaction and glycolysation yielding a pre-polymer;

c. charging a chain extender, in a proportion of about 0.05 wt. % to about 2.0 wt. %, preferably about 0.05 wt. % to about 0.8 wt. %, more preferably about 0.05 wt. % to 0.40 wt. % in the reaction mixture during step (b) in at least one portion or in continuous manner at controlled dosing rate when the intrinsic viscosity of the reaction mixture is <0.20, preferably <0.10;

d. subjecting the pre-polymer to polycondensation at a temperature in the range of about 270° C. to about 305° C. under pressure of less than 10 mb, preferably below 2 mb, more preferably below 1 mb to obtain amorphous chips of I.V in range 0.40 to 0.80;

e. crystallizing the amorphous chips at a temperature in the range of about 110° C.-170° C. to obtain chips with a crystallinity of more than 30%; and f. processing the crystallized chips in a Solid State Polymerizer at a temperature in the range of about 190° C. to about 225° C. till the required I.V of about 0.70 to about 2.0, preferably about 0.90 to about 1.50, more preferably about 0.90 to about 1.40 is achieved to obtain an EBM grade co-polyester resin composition.

As is known in the art, a PET polymer is prepared by three different routes:
by using a 'diol-dicarboxylic acid' pair as the polyester-forming material;
by using 'diol-dicarboxylic ester' pair as the polyester-forming material and
by using diol-PET pair as polyester forming materials;

When the diol-dicarboxylic acid route is employed, the reaction mixture is subjected to esterification. On the other hand, in case of 'diol-dicarboxylic ester' route, the reaction mixture is subjected to the ester-interchange reaction. When PET is employed from recycled PET, first it is glycolized and then further processed.

The diol-dicarboxylic acid Route:

The different di-carboxylic acids that are used in the process of the present invention include purified terephthalic acid, isophthalic acid, adipic acid and sebacic acid. In accordance with one of the embodiments of the present invention, purified terephthalic acid is used as the di-carboxylic acid. The esterification step is carried out at a temperature in the range of about 200 to 300° C., preferably 220 to 280° C. and very preferably 240 to about 280° C. under the pressure up to about 4.5 bar for a period of about 1 to 10 hrs, preferably 1.5 to 6 hrs and very preferably 2.0 to 2.5 hrs. Typically, the molar ratio of the diol and the di-carboxylic acid in the diol-dicarboxylic acid pair is in the range of about 1.04 to about 1.45. The catalyst typically used for the polycondensation method step include at least one polycondensation catalyst selected from the group consisting of Antimony compounds, Germanium compounds, Titanium compounds, Tin compounds and Aluminium compounds. The Sb content can be in the range up to 300 ppm, preferably below 260 ppm. The Ge content can be up to 150 ppm, preferably below 80 ppm. The Ti or Sn or Al content can be up to 200 ppm. It is always possible to use combination of these catalysts to get optimum results.

When the 'diol-dicarboxylic acid' route is used, the co-monomer is selected from the group consisting of isophthalic acid, neopentyl glycol, pentaerythritol, glycerol, adipic acid, 2,6 Naphthalene Dicarboxylate (NDC), 2,6-Naphthalene dicarboxylic acid (NDA).

Figure 4:
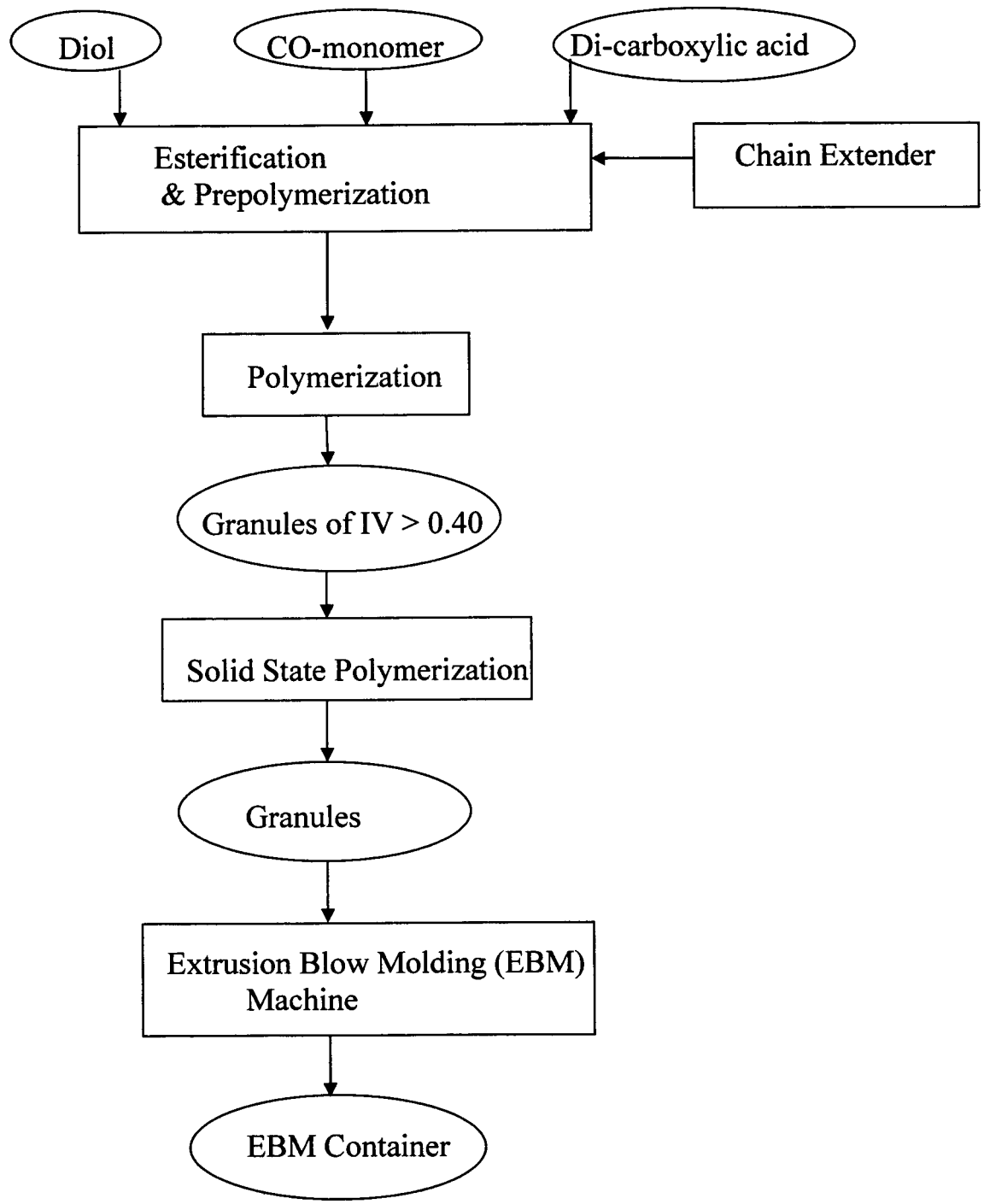
FIG. 4: Flow chart illustration of the process in accordance with the present invention which employs diol-dicarboxylic acid route

Typically, the polycondensation reaction is carried out at a temperature in the range of about 270 to about 305° C., preferably at 270 to about 290° C. at a pressure of less than 10 mb, preferably below 2 mb, more preferably below 1 mb The process of the present invention wherein the diol-dicarboxylic acid Route is employed has been illustrated by a flow-chart in FIG. 4.

The Diol-dicarboxylic ester Route: [DMT]

Figure 5:
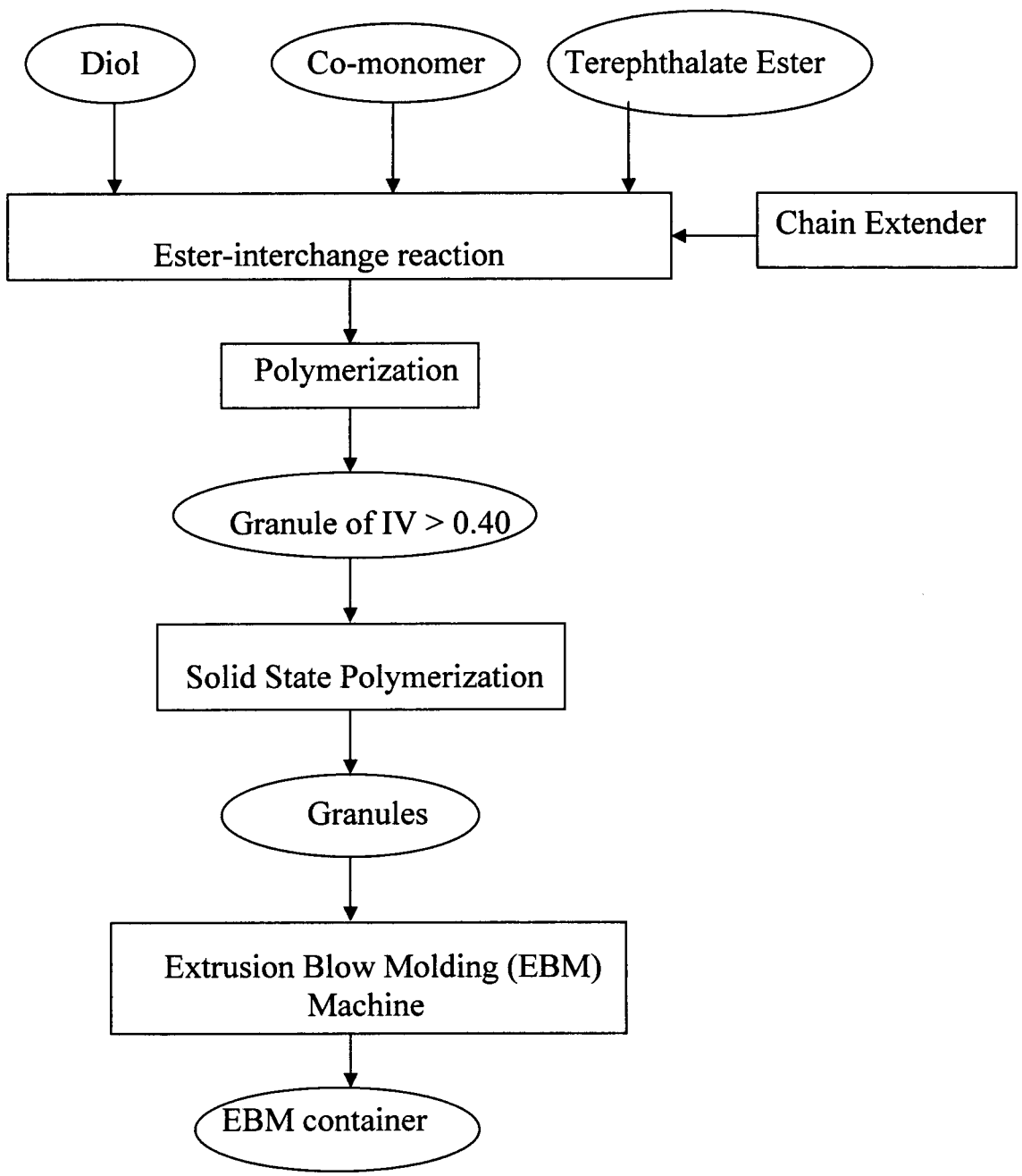
FIG. 5: Flow chart illustration of the process in accordance with the present invention which employs diol-dicarboxylic ester route.

In case of the 'diol-terephthalate ester' route, di-methyl terephthalate, a terephthalate ester is one of the polyester forming materials along with a diol. The molar ratio of diol and the dimethyl terephthalate ranges between 2 to about 2.25. The temperature at which the ester-interchange reaction is carried out ranges between 140° C. to about 270° C. for a period of about 30 minutes to 3 hrs and the reaction is carried out under absolute pressure of about 200 mbar to about 1200 mbar, preferably about 500 mbar to about 1100 mbar. Zinc acetate and Manganese acetate either alone or in combination is used as the catalyst in the ester-interchange reaction. When the 'diol-dicarboxylic ester' route is employed, Dimethyl isophthalate is used as the co-monomer. The process of the present invention wherein the diol-dicarboxylic acid Route is employed has been illustrated by a flow-chart in FIG. 5.

As mentioned herein above, in accordance with the process of the present invention, the chain extender is added in the reactor during the time when the process of pre-polymer formation has just begun in the reaction mixture. In order to ensure the incorporation of the chain extender at this stage, it is incorporated in the reactor before the intrinsic viscosity of the reaction mixture reaches a pre-determined value. This pre-determined value is typically below 0.2, preferably below 0.1.

In accordance with the present invention the diol is at least one selected from the group consisting of monoethylene glycol, diethylene glycol, triethylene glycol, butanediol, propanediol, and polyethylene glycols with a weight average molecular weight of up to 4000 g/mol, proportion of polyethylene glycol in said mixture being up to 5% with respect to the mass of the total mixture.

In accordance with another embodiment the diol is monoethylene glycol.

Typically, the proportion of the co-monomer with respect to the mass of the reaction mixture is in the range of about 4 to about 20%, preferably about 6 to 15%, more preferably in the range of about 8 to 12%.

In the context of the present invention 'chain extender' means a hydrocarbon compound having at least two functional groups.

A polymeric reactive chain extender used in accordance with the present invention is a copolymer of recurring units of an epoxy-functional (meth)acrylic acid derivative, a non-functional styrene derivative and/or a non functional (meth) acrylic acid derivative. The term (meth)acrylic acid derivative includes the free acid, esters and salts of acrylic acid and methacrylic acid. Typical esters are the methyl, ethyl, propyl, n-butyl, tert.-butyl, pentyl, 2-ethylhexyl or hexyl esters. Typical salts are the sodium, potassium, ammonium or zinc salts of the respective acid.

The term epoxy-functional (meth)acrylic acid derivative embraces any epoxy-group containing derivative of acrylic and methacrylic acid. Typically these are epoxy-group containing esters of the respective acid, such as glycidyl acrylate and glycidyl methacrylate.

A non functional styrene derivative is, for example, styrene, α-methylstyrene or dodecylstyrene.

Typically, the copolymer is a copolymer of glycidyl(meth) acrylate, styrene, n-butylacrylate, 2-ethylhexylacrylate and methylmethacrylate with more than 5% by weight of glycidyl (meth)acrylate, based on the weight of the monomer mixture.

Typically, the chain extender is at least one copolymer containing at least two, preferably at least three epoxy groups in average per polymer chain and a number average molecular weight $M_n$ in the range from 1000 to 10000 Dalton.

Typically, the chain extender is at least one copolymer having an epoxy equivalent weight in the range of 150 to 700, preferably 180 to 400, and very preferably 200 to 320.

Typically, the chain extender has an epoxy equivalent weight between 180 and about 2800, a weight average epoxy functionality value up to about 140 and a number average molecular weight Mn value of less than 10000 Dalton, preferably less than 6000 Dalton as defined in U.S. Pat. No. 6,984,694.

The above mentioned copolymers are items of commerce and, for example available from BASF SE under the tradename "Joncryl"®, in particular Joncryl ADR 4300, 4370, 4368, 4380 and 4385 or similar polymeric chain extender from BASF. These products, their preparation and general use are for example described in U.S. Pat. No. 6,984,694.

Typically, the chain extender is at least one selected from the group consisting of Joncryl ADR 4300, 4370, 4368, 4380, and 4385. In accordance with a still another embodiment of the present invention, the polymeric chain extender is Joncryl ADR 4368 with a weight average molecular weight Mw of 6800 and having an epoxy equivalent weight of 285 g/mol.

Other chain extenders that may be used in the preparation of co-polyster resin composition of the present invention include bisoxazolines, phenylene-bis-oxazoline, Carbonyl bis (1-caprolactam), bis-anhydrides, diepoxide bisphenol A-glycidyl ether and the like.

In order to ensure homogeneous distribution of the chain extender, preferably the chain extender is charged in the form of a pre-mix comprising the chain extender and a carrier selected from the group consisting of powdered PET and powdered Co-PET. Typically, the proportion of the chain extender is in the range of about 0.05 to 0.8% with respect to the mass of the reaction mixture. The stabilizer used in the process of the present invention is at least one aliphatic phosphate selected from the group consisting of carboxy ethyl dimethyl phosphate, and phosphoric acid.

Typically, the color toner is at least one selected from the group consisting of cobalt acetate and polymer soluble dyes. Preferably, cobalt acetate is used as a colorant.

Another additive, the impact modifier that is employed in accordance with the process of the present invention is at least one aliphatic higher chain diol selected from the group consisting of Polyethylene Glycol (PEG-400), Ethylene Acrylic Ester Maleic Anhydride/Glycidyl Methacrylate (Lotader), Ethylene Methyl/Butyl Acrylate (Lotryl), Styrene Ethylene Butylene Block copolymer (Krayton).

The process in accordance with the present invention offers to achieve a cost performance balance for manufacturing different sizes and shapes of the container by preparing different grades of the co-polyester resin composition of the present invention. Different grades of the extrudable co-polyester resin composition are produced by varying the proportion of the chain extender that is added in the reaction mixture.

The acetaldehyde (AA) content of the co-polyester resin prepared in accordance with the process of the present invention is less than 10 ppm, preferably less than 5 ppm, very preferably less than 3 and especially preferably less than 1 ppm at the end of step e). Typically, the amorphous chips are crystallized in equipment selected from the group consisting of tumble dryer, rotary crystallizer and high rpm agitated reactor (solidaire).

In accordance with the present invention the solid state polymerization is carried out in a reactor selected from the group consisting of batch reactor and continuous reactor.

In accordance with a second aspect of the present invention there is provided a process for preparation of an extrusion-blow-moldable Co-PET resin from recycled PET feedstock, said process comprising the following steps:
converting the cleaned PET bottles to flakes and glycolysing the flakes with monoethylene glycol (MEG) (150 to 350 kg per tone of flakes) in a reactor at a temperature of 190° C. to 260° C. under pressure up to 3.5 bars to obtain a glycolysed product;
admixing a co-monomer and at least one additive selected from the group consisting of impact modifier, antioxidant, catalyst and colour toner with the glycolysed product, under continuous stirring, for a period of about 40-60 minutes at a temperature of about 240° C. to obtain a reaction mixture; The comonomer typically is Isophthalic Acid (IPA)
charging a chain extender, in a proportion of about 0.05 wt. % to about 2.0 wt. %, preferably about 0.05 wt. % to about 0.8%, in the reaction mixture in at least one portion or in continuous manner at controlled dosing rate when the intrinsic viscosity of the reaction mixture is <0.20, preferably <0.10;
subjecting the reaction mixture to polymerization to get amorphous co-polyester; and crystallizing the amorphous co-polyester followed by solid state polymerization to obtain EBM grade PET.

Typically, the recycled PET is at least one selected from the group consisting of post consumer recycled PET and post industrial recycled PET.

Figure 6:
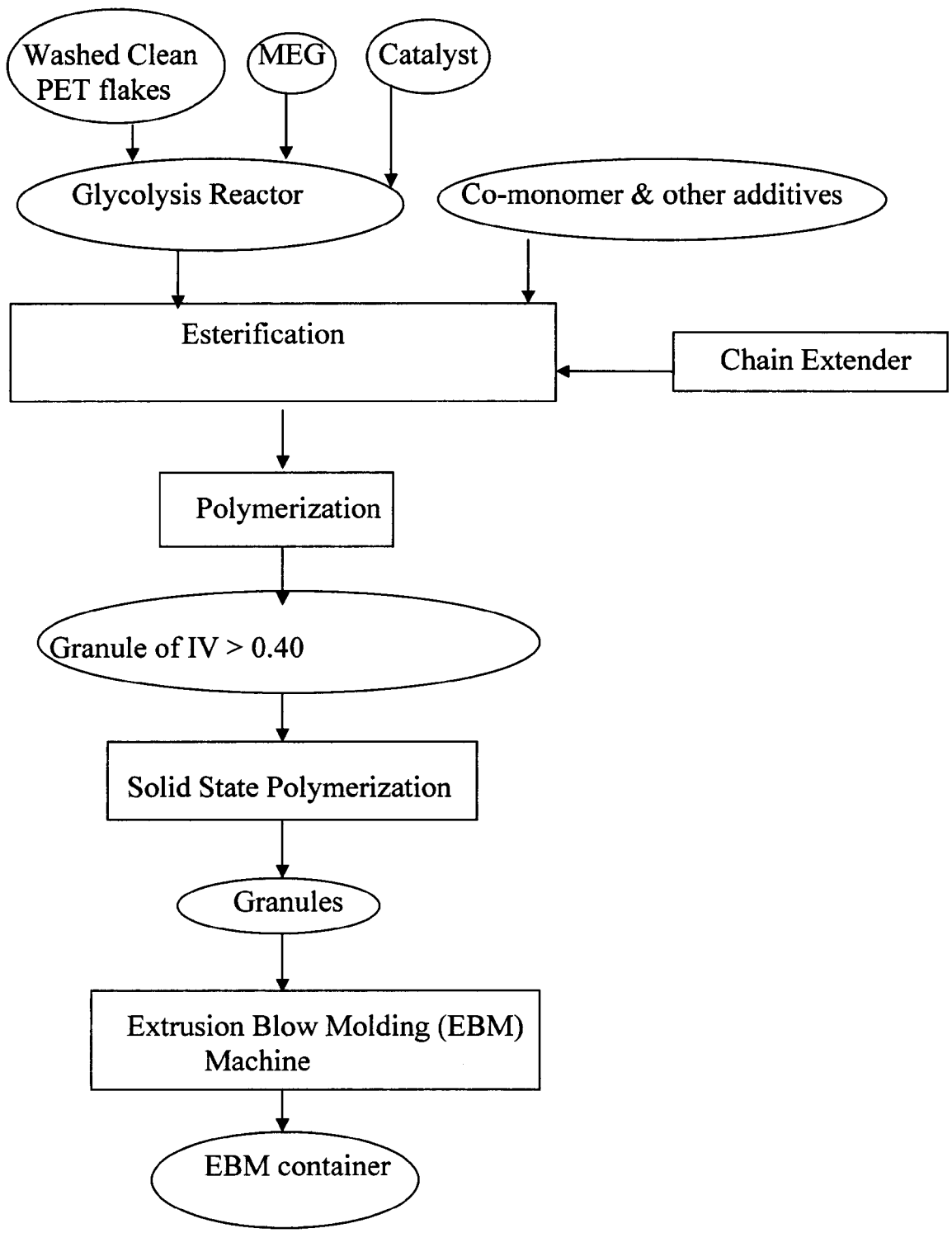
FIG. 6: Flow chart illustration of the process in accordance with the present invention which employs the recycled PET feedstock as the starting material

All the additives employed in the process for preparation of an extrusion-blow-moldable Co-PET resin from the recycled PET feedstock in accordance with the present invention and the additives and their respective proportions as used in the process for a process for the preparation of an extrusion-blow-moldable co-polyester resin composition from polyester forming materials, are the same except that the later process does not employ Purified Terephthalic Acid (PTA)/Dimethyl Terephthalate (DMT) and Zinc acetate and manganese acetate (catalysts). FIG. 6 provides a Flow chart illustration of the process in accordance with the present invention which employs the recycled PET feedstock as the starting material In accordance with one of the embodiments of the present invention there is provided a process for preparation of co-polyester resin composition wherein the proportion of the chain extender is about 0.05 wt. % to about 2.0 wt. %, preferably about 0.05 wt. % to about 0.8%, more preferably 0.05 wt. % to 0.4 wt. % with respect to the mass of the reaction mixture and the EBM-grade co-polyester resin composition obtained has intrinsic viscosity in the range of about 0.80 to about 1.40 and is gel free and transparent.

In accordance with another aspect of the present invention there is an extrusion-blow-moldable co-polyester resin composition with intrinsic viscosity in the range of about 0.70 to about 2.0 which includes a chain extender in the proportion of about 0.05% to about 2.0% with respect to the mass of the resin added before polymerization in at least one portion or in continuous manner at controlled dosing rate when the intrinsic viscosity of the reaction mixture is <0.20, preferably <0.10.

Typically, the melt strength of the co-polyester at a temperature of 260° C. to 275° C. is in the range of about 0.05 N to 0.5 N, preferably 0.08 N to 0.25 N and the haul-off speed is in the range of about 20 m/min to 180 m/min, preferably about 60 m/min to 160 m/min.

Typically, the extrusion-blow-moldable co-polyester resin composition is characterized by L* transmission value >92.0%, a* color value of between −1.0±0.5 and b* color value of between 0.3±0.5 as classified by the Hunter L*a*b* color space.

In accordance with another aspect of the present invention there is provided an extrusion-blow-molded shaped article optionally having an integral hollow handle formed from the co-polyester resin composition of the present invention.

Typically, the shaped article is at least one article selected from the group consisting of a parison, a container, a film and a tube.

Typically, the volume of the shaped article is in the range of about 20 ml to about 25 liters.

In accordance with one of the embodiments of the present invention the extrusion-blow-molded shaped article formed from the co-polyester resin composition is transparent.

The shaped articles manufactured from the EBM grade co-polyester composition of the present invention are useful for packaging of various food and non-food articles.

Provided herein below are the various characteristic properties of the extrusion-blow-moldable co-polyester resin composition of the present invention, prepared in accordance with the process of the present invention which employs the 'polyester-forming materials' as the starting materials, wherein the proportion of the chain extender is in the range of 0.1 to 0.4%. The characteristic properties of the shaped articles prepared from said composition are also provided in the last column of the table herein below.

TABLE A

| Characteristic property | Range for the resin composition | Range for a shaped article |
|---|---|---|
| Intrinsic viscosity | 0.80 to about 1.40 | 0.780 to about 1.380 |
|  | 0.80 to about 2.0 | 0.780 to about 1.80 |
| Melt strength | 0.05N to 0.5N, preferably 0.08N to 0.25N | Not Applicable |
| Clarity Hunter Haze value | Haze value <1 NTU (Nephelometric Turbidity Units) | Transparent bottles |
| Color L* Transmission value | >92.0% | Bottles with good colour without any tinge |
| a* | −1.0 ± 0.5 |  |
| b* | 0.3 ± 0.5 (Hunter lab values) |  |
| Acetaldehyde content | <1 ppm | between 3 to 5 ppm depending on EBM process |

Provided herein below are the procedures and apparatus used for the determination of various characteristics of the product of the present invention.

A] Determination of Instrinsic Viscosity
1) Principle

The polymer is dissolved in a mixture of Phenol/1.2 dichlorobenzene solvent whereupon the time of flow is determined in an Ubbelohde Viscosimeter.

The relative viscosity is obtained from the quotient of the time of flow of the Polymer solution (t) and that of the pure solvent (to) as $$n_{rel} = \frac{n_o}{n_o} = \frac{t}{to}$$

The relative viscosity is linked with the intrinsic viscosity via. Bill Meyer's equation.

$$n\,intr = \frac{1}{4} \times \frac{n_{rel}-1}{C} + \frac{3}{4} \times \frac{\ln n_{rel}}{C}$$

The intrinsic viscosity is defined as the limiting value of the ratio of the natural logarithm of the relative solution viscosity to the concentration 'C' of the polymer in the solution for 'C' against '0'

$$Iintr_{c->0} = \lim \frac{\ln n_{rel}}{C}$$

It depends on the solvent, on the temperature at which the relative viscosity is determined and on the concentration 'C,' Conc. 'C' is to be shown is g/100 ml.

In this method of analysis the relative solution viscosity is determined at Conc. 'C'=0.5 up to 0.65 g/100 m 2) Equipment/Glass Wares
    Viscosimeter, Capillary tube type (Ubbelohde)
    Viscosimeter rack for fixing the viscosimeter
    Perspective bath Thermostat with S.S.Cover
    Thermometer 0-50° C.-0.1° C. graduation
    Auto Burette—50 ml
    Block heater/stirrer
    Stoppered Conical flask—50 ml
    Magnetic stirring rod (25 mm long)
    Stop watch
    Teflon tapes
3) Chemicals
    Phenol (AR Grade)
    1.2 Dicholorobenzene (AR grade)
    Chloroform (AR.Grade)
4) Procedure:
    4.1 Preparation of Phenol & 1,2 Dichlorobenzene solution:
        4.1.1 Heat the phenol at 60° C. in oven until it is completely homogenized.
        4.1.2. Add 510 ml of 1,2-dichlorobenzene in a bottle of containing 1.0 kg Phenol (3:2) by wt.
        4.1.3. Filter the solution in to the amber colour stock glass bottle.
        4.1.4. Place the auto burette on the stock bottle and make sure that it is free from air bubbles.
        4.1.5 Store the glass bottle at room temperature
    4.2. Calibration of the Viscometer
        4.2.1. Set the thermostat at 25° C. (±0.1° C.) temperature
        4.2.2. Fill the viscosimeter duly cleaned and dried with the prepared solution up to the filling mark (approx. 17 ml)

4.2.3. After 1 minute measure the time of flow of phenol/1.2 dichlorobenzene solution
4.2.4. Take 5 measurements & determine the mean value from it. ($t_o$ time) Determine "$t_o$" time for each freshly prepared Phenol/1.2 dichlorobenzene solution.
4.2.5. Clean the viscometer with chloroform and dry it in an oven at 150° C. for 30 minutes
4.2.6. "$T_o$" time of viscometer should be 80-120 sec.
4.3. Sample Preparation:—For crystalline polyester chips press the chips using pressing machine.
4.4. Measurement
4.4.1. Weigh 125-145 mg of polymer to an accuracy of 0.1 mg into the 50 ml stoppered conical flask
4.4.2. Add magnetic stirring rod and 25 ml of phenol/1.2 dichlorobenzene solution accurately using autoburette and seal the stoppered conical flask using Teflon tape
4.4.3. Dissolve the sample at 120° C. in a glycol bath with stirring for 15 minutes & allow to cool at 25° C.
4.4.4. Rinse the viscometer with sample solution and then Suck the solution by using water jet vacuum pump
4.4.5. Allow the solution to reach the 25° C.
4.4.6. Fill the sample solution into the dried viscometer between two marks
4.4.7. Determine the time of flow of the Polymer solution. Take 3 measurements (Deviation not more than 0.2 sec.)
4.4.8. Calculate the mean value of the 3 measurements.
5) Calculation
5.1. Determine The Relative Viscosity $$I_{rel} = \frac{t_1}{T_o}$$

where, $t_1$=mean time of flow of polymer solution in seconds
$t_2$=mean time of flow of solvent in seconds
5.2. Factor F
The Factor F is available from the table with the value of relative viscosity.
5.3. Calculation Of Intrinsic Viscosity $$\text{Intrinsic Viscosity} = \frac{F}{\text{Wt. of Polymer in mg.}}$$

6) Accuracy: ±0.003 dl/gm relative
B] Determination of Melt Flow Index:
Melt flow Index Tester:— Make: International Equipments Model No.: KAYJAY AC
1.0 Purpose
To determine the Melt Flow Index of PET polyester chips.
2.0 Scope: It is applicable to PET Polyester crystallized chips
3.0 Description
The Melt Flow index (MFI) of a thermoplastics is the measured gravimetric flow rate of a sample melt extruded from a die of specified length and bore diameter under prescribed conditions of temperature and pressure.
4.1 Equipments/Glass Wares
Melt Flow Index Tester and allied accessories
Balance
4.2 Chemical
Thermoplastic sample whose MFI is to be determined
Xylene or tetra hydro naphthalene.

4.3 Procedure
4.3.1 Start the MFI tester and set the temperature at which MFI is to be determined.
4.3.2 After achieving desired temperature of tester, take 5 to 6 gms of material in the form of pellets in a spoon and slowly feed it inside the barrel from the top using a material charger to purge it down properly inside the barrel in order to avoid air traps.
4.3.3 Use a funnel if the material is highly sticky which ensures proper insertion of material and avoids any sticking or restriction on the barrel opening.
4.3.4 Insert the piston on the top of material inside the barrel.
4.3.5 Apply the load of 2.16 Kg on the top of the piston just after preheating time of 1 to 3 min is completed.
4.3.6 The rotor will take a reject cut and the timer starts immediately from "0" and set the time (1 min as per requirement). Take the cut for a specified time of 1 min.
4.3.7 Weigh the extruded collected material with respective time and calculate as per the equation.
4.3.8 MFI=10 W/T gm/10 min
Where W=weight of extruded in gm
T=Extrusion time per cut off
4.4 Accuracy: 5% relative
C] Determination of Haze Value by Haze Meter (Nepheloturbidity Meter)
Make: Merck
Model: Turbiquant: 1500 T
1) Principle:
The turbidity of a solution of the polyester in phenol and 1,2-Dichlorobenzene (0.5% by wt.) is measured with laboratory Haze meter. The intensity of the scattered light is compared with Formazine standard solution.
The results are given in nephelometric turbidity units. (NTU)
2) Equipment/Glass Wares:—
Nepheloturbidity meter (Turbiquant 1500 T)
Metering device, 25 ml with stock bottle (2.5 lit)
Block heater/Stirrer, 50 ml conical flask
Magnetic stirring rod (25 mm long)
Cuvettes with caps d: 25 mm, vol—30.0 ml
Measuring flasks, 50.ml, 100 ml, 200 ml, 1000 ml
Graduated pipettes—1.0 ml, 10.0 ml.
General equipment for analytical work
3) Chemicals:—
Phenol (AR), HPLC Water.
1.2 Dicholorobenzene (AR), Hydrazinium Sulphate p. a.
Hexamethylenetetramine, Formazine-standard-solution 1000 NTU, 10 NTU, & 0.02 NTU.
4) Preparation of Solutions:—
4.1. Preparation of Phenol and 1,2 DCB solution
4.1.1 Heat phenol with shaking at 60° C. in drying oven until it gets completely homogenized
4.1.2. Add 510 ml of 1,2-dichlorobenzene in a bottle of containing 1.0 kg phenol (3:2) by wt.
4.1.3. Filter the solution into the stock bottle (amber colored).
4.2. Preparation of Formazine Primary Standard Solution
4.2.1 Weigh 5.0 gm hexamethylenetetramine into a 100 ml glass beaker, dissolve in non-turbid water and make up the volume to 40 ml with non-turbid water (solution A)

4.2.2 Weigh 0.5 gm hydazinium sulphate into a 100 ml glass beaker, dissolve in non-turbid water and make up the volume to 40 ml with non-turbid water (solution B)

4.2.3 Place solutions A and B in a 100 ml volumetric flask and mix carefully (gently swiveling the flask to and fro) and fill up the volume to 100 ml.

4.2.4 Allow to stand for 24 hrs. at 25±3° C.

4.2.5 The turbidity of this solution is 4000 NTU.

4.3 Preparation of Dilutions 4.3.1 Add 25 ml of formazine stock solution (4000 NTU) to a 100 ml glass volumetric flask. Make up the volume to the mark with non turbid water and mix gently swiveling the flask to and fro. The turbidity of this dilute standard solution is then 1000 NTU.

Working Standard Solutions are needed for the calibration of Turbidity meter. The required working standards can be prepared from the dilute standard solution 1000 NTU according to the table below.

| 0.02 pure LiChrosoiv ° Water | |
|---|---|
| Required NTU Standard | ml of 1000 NTU Solution |
| 10. | 1.0 |
| 100 | 10.0 |

The required working standards can be prepared from the dilute standard solution 4000 NTU according to the table below:

| Required NTU Standard | ml of 4000 NTU Stock solution |
|---|---|
| 1000 | 25.0 |

4.3.2 Place the required amount of 1000 NTU dilute standard solution respectively 4000 NTU stock solution in a 100 ml volumetric flask, make up the mark with non turbid water and mix by gently swivelling to and fro. If other concentrations are requested as comparison samples, the ratio of stock solution of water is altered respectively.

NB:—In order to prevent the formation of air bubbles that may falsify measurements, it is important not to shake the flask but to swivel it gently to and fro.

Storage:—Store in a dark place at 25±3° C. Heat and light tend to accelerate decomposition of the polymer structure. The solution should also be kept away from contact with air in a order to prevent oxidation of the Formazine Polymer strands.

5) Sample Procedure: For SSP, grind the chips using liquid nitrogen

6) Procedure:—

The instrument is calibrated initially according to the manual.

6.1. Weigh 0.125 gms of polymer to an accuracy of 0.1 mg into the stoppered conical flask 6.2. Add magnetic stirring rod and 25 ml of phenol/1.2 Dichlorobenzene solution 6.3. Heat the sample vessel at 120° C. in a heating block and dissolve the sample under stirring within 15 minutes 6.4. Allow to cool (at 25° C.) the solution 6.5. Fill the 25 ml of the solution in to NTU cuvette.

6.6 Put the sample cuvette in the instrument and measure the turbidity. The results are given as nephelometric turbidity unit (NTU) on the display.

6.7 Measure the turbidity of the pure solvent. The blank should be between 0.2 and 0.4 NTU 6.8 A solvent containing particles has to be filtered before use 7) Calculation:—

NTU (sample)—NTU (bv)=NTU (Polyester)

With NTU: Nephelometric Turbidity Unit

Samples Polyester solution in Phenol/1,2 dichlorobenzene.

The lowest constantly measured value gives its true turbidity of the sample.

8) Accuracy:—0.1 NTU

D] Determination of Colour:

a) Amorphous Chips

1) Principle

The tristimulus colour difference meter determines the colour of the sample using three photocells which are proceeded by a red, green and blue filter respectively.

2) Equipment/Glass Wares

Glass beakers

Duster

Tristimulus colour difference meter—Q-Colour-35.

Standard plate white S.No. 90001570

Measuring cup (glass)

3) Procedure 3.1. Switch 'on' the instrument before 1 hour to start the measurement.

3.2. Calibrate the instrument 3.3. Take approximately 100 gm of PET Chips into a Glass plate.

3.4. Place it in a drying oven at 150° C. for 30 minutes 3.5. Cool the chips to the room temperature.

3.6. Place the crystallized chips in the measuring vessel. Remove the possible hallows spaces by tapping the bottom edge of the vessel.

3.7. Place the measuring vessel containing the PET sample on the measuring device of instrument.

3.8. Measure the color values as per the manual of Instrument 3.9. Operation should be strictly as per the manual of Instrument 4) Evaluation:—Report Hunter L, a and b from the display of the monitor.

5) Accuracy:—±0.1% absolute b) SSP Chips

1) Principle

The Tristimulus colour difference meter determines the colour of the sample as three photocells, which are proceeded by a red, green and blue filter respectively.

2) Equipment/Glass Wares

Glass beakers

Duster etc.

Tristimulus colour difference meter—Q-Colour-35.

Standard plate white S.No. 90001570

Measuring cup, glass

3) Procedure 3.1. Switch 'on' the instrument before 1 hour to start the measurement.

3.2. Calibrate the Instrument.

3.3. On cooling with liquid Nitrogen, grind approx. 50 gm of SSP Chips in centrifugal grinder by applying sieve fraction <0.4 mm 3.4. Fill the powder of chips in the measuring vessel. Remove possible hallows spaces by tapping the bottom edge of the vessel 3.5. Place the measuring vessel containing the PET sample on the measuring device of instrument 3.6. Measure the color values as per the manual of Instrument
3.7. Operation should be strictly as per the manual of Instrument
4) Evaluation:—
Report the Hunter L, a and b from the display of the monitor.
5) Accuracy:—±0.1% absolute E] Determination of Acetaldehyde (AA)
1) Principle
The acetaldehyde is expelled from the PET by heating it in a closed vessel, whereupon it is Gas Chromatographically determined in the gas volume of the vessel according to the Head Space method of analysis.
2) Apparatus
  Gas chromatograph with FID (Make: Schimadzu Model—14B), Column-1.5 m, S.S., O.D-⅛"
  Filling-Porapack Q, 80-100 Mesh, Head space injection system
  Micro liter syringe with needle: 5 cm length, 10 µl (capacity)
  Centrifugal Grinder, RETSCH-ZM 1, with sieve 1 mm
  Gas Tight Syringe—5 ml, Septum bottle, 30 ml (Capacity) with silicon septa and Al. Seal Caps.
3) Reagents
  Acetaldehyde (A.R.), Nitrogen of highest purity and liquid Nitrogen
4) Preparation of Test Mixture
4.1. Take 45 ml of distilled water into a 50 ml volumetric flask with septum cap.
4.2. Weigh in it about 0.05 gm of pure Acetaldehyde with an analytical accuracy with the aid of syringe.
4.3. Fill the volumetric flask with water Up-to the mark. And mix well.
1 µl of solution=1 µgm of Acetaldehyde.

| Solution | Test No. | µg AA | PPM AA |
|---|---|---|---|
| 0.05 gm AA/50 ml | 10 µl | 10 µg | 10 |
| | 5 µl | 5 µg | 5 |
| | 2 µl | 2 µg | 2 |
| | 1 µl | 1 µg | 1 |

5) Preparation of the Standard Calibration Curve
5.1. Inject via sample loop 5 ml of each of the above prepared mixture under the following G.C. Conditions
G.C. Conditions:
Column: 1.5 M, stainless steel, OD ⅛"
Filling: Poropack Q.80-100 mesh
Gases: Carrier gas N2=50 ml/min
Burning gas H2=45 ml/min
Air=300 ml/min
Temperature: Column=150° C.
  :Detector=220° C.
  :Sample loop=150° C.
Inj. Volume: 5 ml
Amplifier Damping: 11 C (high)
  5.2. Plot the graph of Conc. (µg AA) of tests against IU (Integrator Unit [AREA]) and calculate the slope (area/Conc.)
6) Procedure Determination of Acetaldehyde by G.C.
6.1. On cooling with liquid nitrogen, grind 10 gm of PET chips to be tested in centrifugal grinder. Use a sieve fraction <0.4 mm for analysis
6.2. Weigh 2 gm of sample into the vial pre-flushed with liquid nitrogen
6.3. Seal the vial. Suspend the vial into the heating block set to a temperature of 150° C.
6.4. Start the Head Space Analyzer with proper steps of the procedure of Instrument Instruction manual.
6.5. After 90 minutes the Head Space analyzer will start automatically for Ejection followed by Injection of vapour phase of the sample under the G.C.Conditions mentioned above.
6.6. After completion of Run, Peak of acetaldehyde is automatically integrated and Area (Integrator Unit) of it will be recorded on the chromatogram with help of printer
7) Calculation
For unknown sample read the IU from chromatogram, take µg AA of plot and calculate the concentration.

$$\text{Acetaldehyde Content (ppm)} = \frac{\text{AREA OF SAMPLE} \times \text{SLOPE}}{W\,(g)}$$

W=sample wt. in gm.
8) ACCURACY:—±0.1 ppm Relative

F] Melt Strength and Stretch Ability Characterization with Rosand Capillary Rheometer
1) RH7, Rosand Capillary Rheometer, Malvern Instruments Limited
2) Die geometry: Length: 20 mm, Ø: 2.00 mm, angle: 180 (L/R=20)
3) Preheat time: 3 min (press until 0.5 Mpa then preheat 2 min, press until 0.5 Mpa then preheat 1 min)
4) Shear rate: 37.6 s−1
5) Piston velocity: 10 mm/min
6) Haul-off maximum drawdown velocity: 1000 m/min
7) Haul-off start velocity: 10 m/min
8) Haul-off ramp duration: 10 min G] Determination of Crystallinity
1) Principle
Density of polymer chips is measure with a floating method by comparison in a density gradient column with an inert and well-wetting liquid.
From the resulting density, Crystallinity can be calculated using density values for totally crystalline polyethylene Terephthalate and for totally amorphous Polyethylene Terephthalate from literature.
2) Equipment's
Work place for Density determination Comprising: Graduated Measuring Column. Heating bath of transparent material
Immersion thermostat
Filing Device Comprising:
Storage flasks, Magnetic Stirrer, Filling tube, Bubble counter.
Calibrated density glass floats within the range of density 1.33-1.45 g/cm$^3$ differing about 0.025 g/cm$^3$ each
Thermometer (0-50° C.)
Hydrometer, Measuring range 1.300-1.360 g/cm$^3$
3) Chemical
n-Heptane (AR.)
Carbon Tetra chloride (AR)
4) Filling and Calibration of Measuring Column
4.1. Mix about 900 ml of carbon tetrachloride with about 350 ml of n-Heptane and adjust the mixture to a density of about 1.330 g/cm3 using Hydrometer.
4.2. Transfer the Mixture to flask $K_1$.
4.3. Ensure that flask $K_1$ is placed at a somewhat higher level than flask $K_2$.

4.4. Add as much carbon Tetrachloride to $K_2$ that the Hydrostatic Pressures above connection V in $K_1$ and $K_2$ are almost identical.

4.5. Slowly Open connecting tap V and check whether both liquids are in hydrostatic equilibrium. Should Some of the liquids in $K_1$ flow into $K_2$ gently add more carbon tetrachloride to $K_2$ until
The Equilibrium is established. In the Reverse case, Lower flask $K_2$ until the Hydrostatic Pressures in both flasks are identical.
(Care must be taken that, With connecting tap V fully open; there will be no more exchange of Liquids between the two flasks.)

4.6. Insert the filling tube in the gradient column so that its lower end stays about 5 mm above the Column bottom.

4.7. Switch on the magnetic stirrer installed underneath flask $K_1$ and make sure that the liquid is well mixed; the agitating cone to be about 15-20 mm deep.

4.8. Open outlet tap H to allow the liquid in flask $K_1$ to run slowly and uniformly into the gradient column at a rate of approximately 2-3 min per cm filling height.
(During a filling operation, Carbon tetrachloride flows continuously from $K_2$ into $K_1$ causing the density of liquid in $K_1$ to rise, the liquid with Higher density always forms a new low layer in the gradient tube.)

4.9. Shut Off the outlet taps V and H when the column is sufficiently filled above the scale top Mark, and carefully remove the filling tube.

4.10. Add the calibrated density floats.

4.11. Cool to 23±0.1° C.

4.12. Allow the floats about 30 minutes for settling and read their positions (average value between upper and lower rim.)

4.13. Plot the Glass floats density versus their Positions on a graph paper. (The Values Obtained should be linear).

5) Procedure 5.1. Introduce the 2-4 sample chips to be determined into the gradient column and allow them to descend.

5.2. On Completion of the corresponding Immersion times Read the Immersion level of each specimen parallax free and determine the average value.

5.3. From the calibration curve, Read the density of each specimen in relation to its immersion level.
(REFER 10-F-66)

6) Calculation:

$$\text{Crystallinity} = \frac{1.455 \times (\text{density} - 1.938)}{\text{Density} \times 0.123} \times 100$$

7) Accuracy: 2% relative

H] Determination of Molecular Weight of the Polymeric Chain Extender

The molecular weight distribution of the polymeric chain extender is measured by Gel Permeation Chromatography (GPC) sometime called Size Exclusion Chromatography. The general procedure and methodology is described in ASTM D5296-05, however, this ASTM method is valid for polystyrene polymers, only. In our case, the solvent for the polymeric chain extender is THF and the gpc columns are two polymer labs Plgel 10 μm mixed bed 300*7.5 mm size exclusion columns plus a PLgel 10 μm guard column, or an equivalent column by another supplier. The detection is done with a temperature controlled refractive index detector. The molecular weight calculation requires the use of uniform polystyrene standards with known molecular weight. The polystyrene polymers for calibration are standard solution of polystyrene provided by Polymer Labs.

After calibration of the instrument, the GPC software will calculate the number average molecular weight and the weight average molecular weight of the sample.

H2 Determination of the number of epoxy group per polymer chain.

The number of epoxy groups per polymer chain and the epoxy equivalent weight of a chain extender can be calculated according to U.S. Pat. No. 6,984,694.

The invention will now be illustrated with the help of following non-limiting examples.

EXAMPLES

Example 1

For the manufacture of Resin (Table 1), monoethylene glycol (MEG) and purified terephthalic acid (PTA) were charged in the reactor in the mole ratio of MEG:PTA::1.10:1.25. Along with MEG and PTA, isophthalic acid (IPA) (5 to 12 wt. percent), impact modifier (PEG-400, 300-1000 ppm or any other impact modifiers in suitable proportion), Catalyst ($Sb_2O_3$ or Sb $(AC)_3$, 100-200 ppm) and Colour toner (Cobalt Acetate hydrogen, 50-60 ppm) were also added. Esterification was carried out at temperature of 240 to 260 deg Celsius under pressure up to 4.5 bars for 2.0 to 2.5 hrs. The chain extender BASF's Joncryl ADR 4368 S, 0.2 wt % was charged continuously at controlled dosing rate for gradual induction. To facilitate good distribution, the chain extender was mixed in PET Powder or CoPET powder with Isophthalic Acid content up to 15 wt % and dosed in to the reactor through a metering screw. At the end of esterification, Stabilizer ($H_3PO_4$ or Tetraethylenepentamine, 150 ppm) was added. Subsequently, polycondensation was carried out at temperature 286° C. under pressure of less than 0.2 mb. The amorphous chips (I.V. of 0.630) (The melt viscosity was checked by Ubbelohde viscometer using a mixture of phenol/1,2-dichlorobenzene) were manufactured and subsequently processed in batch SSP. First crystallization was carried out at temperature range of 130° C. and then SSP was carried out at temperature range of 190° C.-215° C. (Table 2) till the final I.V of 0.80 to 1.40 was achieved.

TABLE 1

| Pilot Polymerization | | | | | | |
|---|---|---|---|---|---|---|
| Batch No | P2/075 | P2/078 | P2/155 | P2/159 | P2/184 | P2/225 |
| PTA (kg) | 38.7 | 39.14 | 31.4 | 31.4 | 23.3 | 23.2 |
| MEG (kg) | 17.5 | 17.2 | 15.0 | 17.5 | 11 | 11.2 |
| IPA (kg) | 4.3 | 3.6 | 3.0 | 3.0 | 2.55 | 2.7 |
| Co (ppm) | 50 | 50 | 50 | 60 | 60 | 60 |
| Sb (ppm) | 200 | 200 | 150 | 100 | 150 | 150 |
| Ge (ppm) | 80 | 80 | 80 | 80 | 80 | 80 |
| P (ppm) | 40 | 40 | 40 | 40 | 150 | 150 |
| Polymeric reactive Chain Extender (%) (Joncryl 4368) | 0.15 | 0.1 | 0.2 | 0.3 | 0.15 | 0.3 |
| PEG-400 (ppm) | 400 | 500 | 500 | 300 | 300 | 500 |
| Esterification time | 3 hrs 40 min | 3 hrs 25 min | 3 hrs 45 min | 3 hrs 35 min | 3 hrs 41 min | 3 hrs 48 min |
| Poly cycle time | 2 hrs 56 min | 1 hrs 26 min | 1 hrs 25 min | 1 hrs 26 min | 1 hrs 30 min | 1 hrs 33 min |
| I.V (dl/gm) | 0.602 | 0.610 | 0.654 | 0.647 | 0.650 | 0.665 |
| —COOH (Mval/kg) | 24.0 | 22.0 | 21.0 | 33.0 | 22.0 | 32.0 |

TABLE 1-continued

Pilot Polymerization

| Batch No | P2/075 | P2/078 | P2/155 | P2/159 | P2/184 | P2/225 |
|---|---|---|---|---|---|---|
| L* | 78.0 | 77.0 | 79.0 | 77.0 | 76.0 | 78.0 |
| a* | −0.8 | −0.1 | −0.3 | −0.1 | −1.1 | −1.0 |
| b* | −1.2 | −0.3 | −0.8 | −2.2 | −0.9 | −0.1 |
| DEG (wt %) | 2.7 | 2.7 | 3.5 | 3.3 | 4.0 | 3.2 |
| IPA (wt %) | 8.8 | 6.8 | 6.7 | 6.5 | 7.7 | 8.1 |
| Cut Off Temperature (° C.) | 3.15 281 | 3.3 284 | 3.1 287 | 3.1 287 | 3.0 2.85 | 3.3 288 |

Melt phase pilot poly: 5 kg batch size
Melt phase pilot poly: 50 kg batch size

The colour and clarity of the polymer prepared in accordance with the present invention were found to be as good as the best available bottle grade polymer for ISBM.

TABLE 2

Pilot Solid State Polymerization

| Poly Batch No. | SSP Batch No. | I.V (dl/gm) | Product temp. (° C.) | L* | a* | b* | MFI gm/10 min (2.16 kg wt) (° C.) 250 | 260 | 270 |
|---|---|---|---|---|---|---|---|---|---|
| P2/075 | TD 810 | 1.05 | 212 | 94.0 | −0.5 | 0.7 | 0.7 | 1.4 | 3.2 |
| P2/078 | TD 814 | 1.17 | 212 | 93.6 | −0.5 | 0.2 | 0.8 | 1.5 | 3.0 |
| P2/155 | TD 827 | 1.22 | 197.5 | 92.7 | −0.1 | 1.4 | 0.3 | 1.2 | 1.9 |
| P2/159 | TD 828 | 1.21 | 210 | 91.0 | −0.1 | 1.9 | 0.3 | 0.9 | 1.4 |
| P2/184 | TD 834 | 1.10 | 207 | 91.5 | −0.4 | 1.7 | 1.4 | 2.5 | 3.2 |
| P2/225 | TD 844 | 1.9 | 215 | 92.0 | −0.5 | 1.6 | 0.3 | 0.9 | 1.5 |

Pilot batch SSP: 25 kg batch size
Pilot batch SSP: 350 kg batch size

The color and clarity of the co-polyester resin composition prepared in accordance with the present invention are found to be as good as the best available bottle grade chips for ISBM application. Furthermore, the final polymer is found to be gel free.

Example 2

Test Example

Characterization of Different Samples (a) Comparison of Melt Strength Vs. Stretch Ability of Samples of Present Invention and Prior Art:

Different samples were prepared by altering the addition rate of polymeric reactive chain extender (Joncryl Chain Extender) during melt phase polycondensation as well as altering the duration in SSP (Solid State Polymerization).

Figure 1:
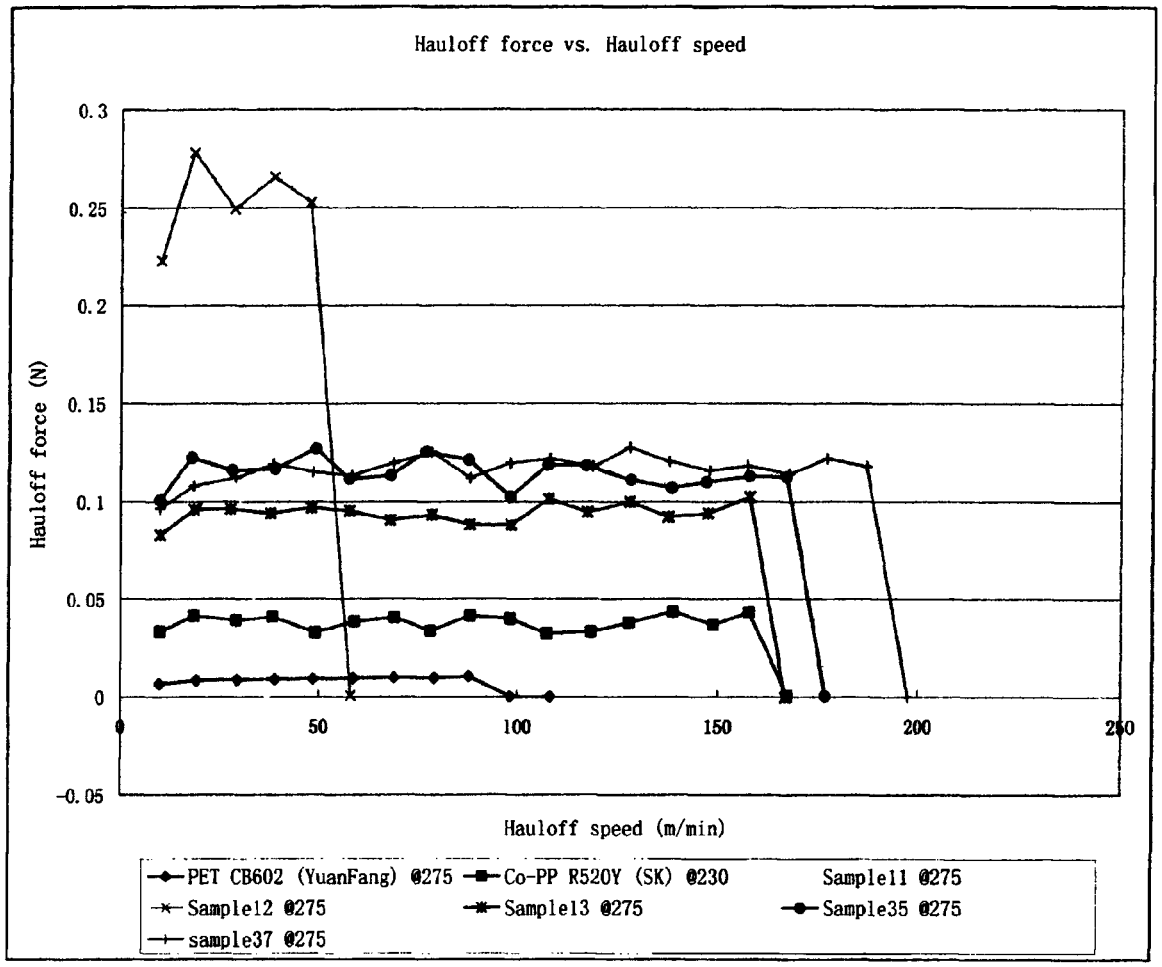
FIG. 1: Graph showing Haul off force (N) vs. Haul off speed (in/min.) for EBM grade PET (Sample no. 11, 12, 13, 35 and 37), ISBM grade PET (PET CB602) and EBM grade PP (R520Y).

Characterization on these different samples was done based on their melt strength in relation to their stretch ability (Haul off speed/breaking speed) (FIG. 1). The data of different samples prepared in accordance with the present invention (Table 3) was compared with data of EBM grade PP and ISBM grade PET (available in the market) (Table 4).

The data when compared clearly indicates that the EBM grade PET of the present invention (Sample no. 11, 12, 13, 35 and 37) has much higher melt strength as compared to both ISBM grade PET (PET CB602) and EBM grade PP (R520Y).

Figure 2:
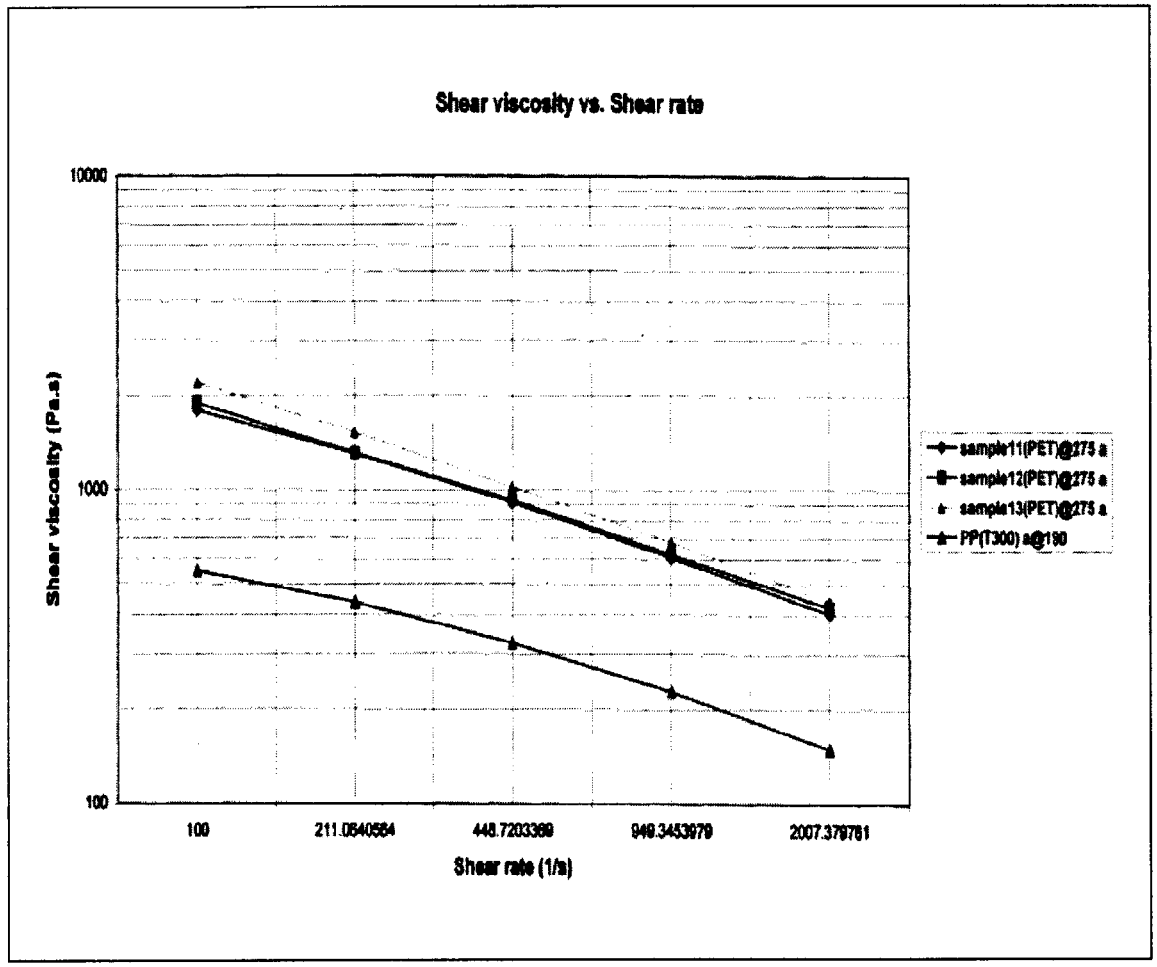
FIG. 2: Graph showing variation in shear viscosity (Pa.s) with variation in shear rate (1/s) for EBM grade PET (Sample no. 11, 12 and 13) and EBM grade PP (T300).

(b) Comparison of Shear Viscosity Vs. Shear Rate of Samples of Present Invention and Prior Art:

Characterization on these different samples was done based on their shear viscosity under different shear rate. A graph showing shear viscosity vs. shear rate of different samples in accordance with the present invention was prepared with EBM grade PP (T300) (FIG. 2).

The results clearly indicate that PET bottles with improved quality parameters can be made through EBM technology using the co-polyesters of the present invention.

TABLE 3

Present Invention EBM grade PET (Sample no. 11, 12, 13, 35 and 37)
Haul off force (N) vs. Haul off speed (m/min.)

| Sample 11 | | Sample 12 | | Sample 13 | | Sample 35 | | Sample 37 | |
|---|---|---|---|---|---|---|---|---|---|
| Haul off speed | Haul off force | Haul off force | Haul off speed | Haul off speed | Haul off force | Haul off speed | Haul off force | Haul off speed | Haul off force |
| 10.00393 | 0.126571 | 10.0065 | 0.222871 | 10.00524 | 0.082964 | 10.00262 | 0.100746 | 10.00524 | 0.096497 |
| 18.62399 | 0.133566 | 18.39487 | 0.278115 | 18.62399 | 0.095974 | 17.9039 | 0.122386 | 18.59126 | 0.108003 |
| 27.2759 | 0.143699 | 28.62333 | 0.249415 | 27.76687 | 0.096366 | 28.23056 | 0.115783 | 29.13066 | 0.112122 |
| 37.11705 | 0 | 38.55722 | 0.265759 | 37.76622 | 0.094078 | 38.99908 | 0.116829 | 38.47539 | 0.119248 |
| | | 47.66955 | 0.252683 | 48.07105 | 0.096955 | 49.0639 | 0.127028 | 48.42564 | 0.115129 |
| | | 58.04857 | 0.000588 | 57.69836 | 0.09532 | 57.66671 | 0.111599 | 58.40862 | 0.113495 |
| | | | | 68.06429 | 0.090613 | 68.17884 | 0.113364 | 68.8662 | 0.119771 |
| | | | | 78.43186 | 0.093228 | 76.88531 | 0.125524 | 78.29275 | 0.125067 |
| | | | | 87.93205 | 0.088194 | 87.64075 | 0.12121 | 88.11208 | 0.111991 |
| | | | | 98.29962 | 0.088129 | 98.09505 | 0.102381 | 98.10596 | 0.119641 |
| | | | | 107.7835 | 0.1014 | 107.5489 | 0.118856 | 107.9962 | 0.122059 |
| | | | | 117.3491 | 0.094601 | 117.1227 | 0.118398 | 118.6829 | 0.11781 |
| | | | | 128.044 | 0.099831 | 128.2731 | 0.111076 | 127.9213 | 0.127617 |
| | | | | 137.5687 | 0.092182 | 138.4634 | 0.107023 | 137.7979 | 0.120425 |
| | | | | 147.4863 | 0.094013 | 147.0171 | 0.11003 | 147.8463 | 0.115849 |
| | | | | 157.9057 | 0.102381 | 157.7884 | 0.112907 | 157.2619 | 0.118202 |
| | | | | 166.7845 | −6.5E−05 | 167.1904 | 0.112514 | 167.7861 | 0.113953 |
| | | | | | | 176.8461 | 0.000262 | 177.1297 | 0.121994 |
| | | | | | | | | 187.0581 | 0.117745 |
| | | | | | | | | 197.2866 | 0 |

TABLE 4

Prior Art (C0.PP R520Y (SK) and Virgin PET (CB602))
Haul off force (N) vs. Haul off speed (m/min.)

| C0.PP R520Y (SK) | | Virgin PET (CB602) | |
|---|---|---|---|
| Haul off speed | Haul off force | Haul off speed | Haul off force |
| 10.00131 | 0.033342 | 9.917519 | 0.006538 |
| 18.56398 | 0.041384 | 19.36371 | 0.008368 |
| 29.19613 | 0.039161 | 29.54526 | 0.008761 |
| 38.30628 | 0.040992 | 39.01545 | 0.008957 |
| 49.02025 | 0.032885 | 48.57293 | 0.009087 |
| 58.98959 | 0.038638 | 58.73593 | 0.00948 |
| 68.97258 | 0.040534 | 69.0544 | 0.009741 |
| 78.06363 | 0.033865 | 79.15031 | 0.00948 |
| 88.07935 | 0.041384 | 87.78477 | 0.01033 |
| 98.04596 | 0.03988 | 98.14415 | 0 |
| 107.1878 | 0.032493 | | |
| 118.2901 | 0.033277 | | |
| 127.9262 | 0.037984 | | |
| 138.7471 | 0.043541 | | |
| 148.7628 | 0.036938 | | |
| 157.6984 | 0.04328 | | |
| 167.3279 | 0.000458 | | |

Example 3

The same procedure as used in Example 1 was used. Various trials were done in 50 kg batch size Pilot Plant with 0.10%, 0.20% & 0.30% addition of Polymeric Reactive Chain Extender, Joncryl ADR 4368 and ADR 4300. The Chain extender was added during esterification, during esterification and prepolymerization. The amorphous resin I.V was in the range 0.640 to 0.650. The resin was processed in batch SSP to get final required I.V of 1.10 to 1.20. The melt viscosity was checked by Ubbelohde viscometer (using a mixture, of phenol/1,2-dichlorobenzene) and also Melt Flow Viscosity (MFI) was checked to confirm the high melt strength. Colour of all the batches was good in both amorphous and SSP stage and also during dissolution of sample in I.V solvent. Presence of gel particles was not detected. Resin sample was also checked on Rheotens to reestablish the melt characteristic to polymer and was found suitable for Extrusion Blow Molding Application.

| Addition of Polymeric Reactive chain extender | | I.V | E | L* | a* | b* | MFI @ 270° C. |
|---|---|---|---|---|---|---|---|
| 0.1% addition | Amorphous | 0.650 | 25 | 80 | −1.0 | −4.0 | 40 |
| | SSP | 1.20 | 15 | 94 | −0.8 | 0.2 | 2.8 |
| 0.2% addition | Amorphous | 0.640 | 28 | 81.5 | −1.2 | −3.5 | 35 |
| | SSP | 1.15 | 14 | 93.8 | −0.9 | −0.3 | 2.7 |
| 0.3% addition | Amorphous | 0.654 | 26 | 80.5 | −0.8 | −3.0 | 32 |
| | SSP | 1.130 | 13 | 93.5 | −0.9 | −0.5 | 2.4 |

Example 4

DMT Route

Monoethylene glycol (MEG) and dimethyl terephthalate (DMT) were charged in the reactor in quantities 33 kg and 46.6 kg respectively for the batch size of 51.2 kg. Dimethyl terephthalate used was in flake form. After initiating stirring and heating 4.6 kg dimethyl isophthalate was charged. Initially the heating rate was controlled to get 140° C. temperature in the reactor. After reaching 140° C. manganese acetate catalyst solution (23 gm in 500 ml ethylene glycol) was added to the reactor. After the addition of the catalyst, ester-interchange reaction was started with the methanol getting distilled through the packed column via the condenser. The column top temperature was maintained at 75° C. to avoid loss of MEG. The product temperature controller set point was gradually and slowly increased from 140° C. to 230° C. in 150 min. During this ester-interchange reaction, the Joncryl® chain extender ADR 4368 was added in 3 equal parts. The total quantity of chain extender added was 0.04 kg. The ester-interchange reaction was carried out at atmospheric pressure. However, the reactor pressure remained at 50 to 80 mb due to methanol generation.

Colour and MFI indicate that the product has good quality and no gel formation was noticed in laboratory.

At 220° C. batch temperature and 150 minutes total ester-interchange time, the reflux was closed and product heating was continued to distill excess glycol. At 230° C., phosphoric acid was added as a stabilizer and Mn as a neutralizer. About 20 ppm Co (85 gm cobalt acetate (hydrous) in 200 ml MEG) was added first. After 10 minutes, required dosage phosphoric acid (21 gm diluted with 100 ml MEG) was added to reactor. The excess EG distillation was completed at batch temperature of 260° C., 25 minutes after completion of ester-interchange 240 ppm Sb and 20 ppm Ge catalyst was added to the reactor and after 10 minutes, the batch was transferred to poly reactor where poly-condensation was carried out at temperature 290° C. under 0.5 mb pressure.

The batch was terminated at I.V. 0.650. The amorphous chips were crystallized in tumble batch dryer at 140° C. for 2 hrs and later I.V. was upgraded to 1.150 at a temperature of 225° C.

| Product quality | I.V | DEG wt % | IPA wt % | E | L* | a* | b* | MFI @ 250° C. | MFI @ 260° C. | MFI @ 270° C. |
|---|---|---|---|---|---|---|---|---|---|---|
| Amorphous chips | 0.650 | 0.6 | 9.0 | 32 | 75 | −1.4 | −3.2 | — | — | — |
| SSP chips | 1.20 | 0.6 | 8.9 | 15 | 91 | −1.2 | 0.2 | 0.8 | 1.6 | 1.8 |

Example 5

Post Consumer PET Bottle Flake Route 10 kg Monoethylene Glycol (MEG) was charged in the esterification reactor. Agitator & heating was started. After reaching 180° C. temperature, 38 kg washed flakes (free from any impurities) were charged gradually in 30 min period. After completion of charging of PET flakes the reactor was pressurized to 4.5 bar absolute pressure with Nitrogen. The reactor temperature was increased to 240° C. and the glycolysis was continued for 40 minutes. Then 2.4 kg Isophthalic acid (IPA) and 1.6 gm GeO$_2$ catalyst was added to the reactor. 40 min time was allowed for reaction of Isophthalic acid (IPA) & water was distilled out as byproduct. During this 40 min 0.08 kg of chain extender was added in 3 equal portions to the reactor.

After completion of reaction of Isophthalic Acid, the batch was transferred to poly condensation reactor. The polycondensation reactor was gradually evacuated to a pressure of 0.5 mb and reactor temperature was increased to 290° C. The polycondensation reaction was monitored based on reactor agitator power consumption and reaction was terminated to get I.V of 0.620. The polymer was extruded to amorphous chips.

Subsequently, the amorphous PET chips were crystallized in batch SSP at temperature of 140° C. and upgraded to final I.V of 1.20

| Product quality | I.V | ECOOH | L* | a* | b* | MFI @ 270° C. |
|---|---|---|---|---|---|---|
| Amorphous Chips | 0.620 | 35 | 78 | −1.3 | −4.0 | 55 |
| SSP Chips | 1.20 | 18 | 92 | −0.7 | −0.5 | 2.8 |

Comparative Example 1

Preparation of Conventional PET Polymer without Additives: Blank PET Polyester

This experiment was carried out without use of any additive in Pilot Plant. Initially, amorphous PET resin was manufactured using PTA & MEG as raw materials. Antimony Triacetate catalyst was added at 200 ppm antimony and Germanium dioxide catalyst was added at 40 ppm germanium. Cobalt acetate was added at 40 ppm cobalt as a colour tonner. The mole ratio of MEG to PTA was maintained at 1.125. The esterification reaction was carried out at a temperature of 250° C. under 3.0 bar pressure for about 2.5 hrs, after completion of esterification reaction which was evident by completion generation of process water as a bi-product. Phosphorous Acid stabilizer was added 40 ppm Phosphorous and the batch was transferred to polymerization reactor where polycondensation was carried out at a temperature of 290° C. under 0.2 mb pressure. The rate of polycondensation was monitored by increase in agitator power consumption and the batch was terminated at preset value of agitator power consumption to get desired intrinsic viscosity (I.V) of 0.650. Subsequently the batch was extruded to make amorphous granules of I.V 0.650.

The amorphous resin produced thus was crystallized at a temperature of 130° C. in batch SSP unit (Tumble Dryer) and then the temperature was increased gradually to 220° C. to facilitate solid state of polymerization under pressure of less than 0.5 mb. Samples were taken at regular interval and rate of SSP was monitored so as to get required I.V of 1.20 and at this I.V, the batch was cooled and vacuum was broken by introducing nitrogen and the final SSP product was taken.

| | Parameters | | | | |
|---|---|---|---|---|---|
| | I.V | E | L* | a* | b* |
| Amorphous chips | 0.650 | 30 | 80 | −1.1 | −4.0 |
| SSP chips | 1.10 | 15 | 94 | −1.0 | 0.80 |

The melt strength of above SSP sample was checked on Rheotons and was found poor. This resin could not be used on EBM machine because of poor melt strength. Also colour (b*) had become yellowish which also made the resin unsuitable for bottle applications, For higher melt strength i.e. higher I.V if we continue SSP further the colour would deteriorate further.

Comparative Example 2

According to the Method of U.S. Pat. No. 5,523,135

Preparation of co-polyester by compounding the additives (Chain extender, co-monomer) Chain extender was compounded with amorphous CoPET chips comprising 8.5% IPA. The Chain extender (Joncryl ADR 4368) content was 0.3% to 0.5% in the final polymer. After compounding it was noticed that the color values deteriorated and there was neither significant increase in I.V nor significant reduction in MFI.

These compounded chips were further processed in batch SSP unit and the IV of the resulting resin was found out to be 0.90. Presence of gel particles was also noticed. Furthermore, there was further deterioration in color value. It was thus found out that it is not possible to get uniform product quality by following the compounding process. Also, it was not possible to attain the required melt strength for EBM application, by compounding the additives with the co-polyester after the polymerization process.

2A) with 0.3% chain extender

| With 0.3% chain extender | I.V | E | L* | a* | b* | MFI @ 250° C. | MFI @ 270° C. | DEG | IPA |
|---|---|---|---|---|---|---|---|---|---|
| Amorphous resin before compounding | 0.579 | 32 | 78 | −0.2 | −3.0 | 48 | — | 1.45 | 8.5 |
| Amorphous resin after compounding | 0.651 | 32 | 75 | −0.2 | −1.0 | 41.6 | — | 1.45 | 8.5 |
| SSP product | 0.95 | — | 89 | −0.8 | 0.9 | — | 15 | 1.45 | 8.5 |

2B) with 0.5% chain extender(Joncryl ADR 4368)

| With 0.5% chain extender | I.V | E | L* | a* | b* | MFI @ 250° C. | MFI @ 270° C. | DEG | IPA |
|---|---|---|---|---|---|---|---|---|---|
| Amorphous resin before compounding | 0.582 | 30 | 78 | −0.2 | −2.0 | 48 | — | 1.45 | 8.5 |

-continued

| With 0.5% chain extender | I.V | E | L* | a* | b* | MFI @ 250° C. | MFI @ 270° C. | DEG | IPA |
|---|---|---|---|---|---|---|---|---|---|
| Amorphous resin after compounding | 0.645 | 32 | 75 | −0.8 | −0.8 | 37 | — | 1.45 | 8.5 |
| SSP product | 0.90 | 31 | 75.2 | −1.3 | 1.2 | — | 11.9 | 1.45 | 8.5 |

SSP was discontinued since gel-formation was observed in the amorphous resin.

Technical Advancements of the Present Invention:

The bottles and containers formed from the co-polyester of the present invention possess high clarity and good gloss and the color values and the clarity of containers is at least as good as transparent containers of good color made from bottle grade PET by ISBM.

The crystallized co-polyester resin in accordance with the present invention is ready for processing immediately after the drying process. The polymer chips can be dried by conventional hopper dryers at temperature 160° C.-175° C. using dehumidified air. There is no need of blending or compounding at the bottle manufacturer's end.

The co-polyester resin composition in accordance with the present invention offers the advantage of faster processing on account of faster reaction rates in both melt phase polymerization and Solid State Polymerization.

The co-polyester resin composition of the present invention is suitable for EBM application for manufacturing of hollow containers, parisons of very good colour and clarity in various designs, shapes and volumes with or without inbuilt handle.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

While considerable emphasis has been placed herein on the specific features of the preferred embodiment, it will be appreciated that many additional features can be added and that many changes can be made in the preferred embodiment without departing from the principles of the invention. These and other changes in the preferred embodiment of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A process for preparing an extrusion-blow-moldable co-polyester resin composition; the process comprising:
   (a) charging in a reactor
      at least one pair of polyester-forming materials selected from the group of pairs consisting of a diol-dicarboxylic acid pair, a diol-dicarboxylic ester pair, and a diol-recycled PET pair,
      a co-monomer, and
      at least one additive selected from the group consisting of an impact modifier, an antioxidant, a catalyst, an acetaldehyde inhibitor, and a color toner,
   to obtain a reaction mixture;
   (b) subjecting the reaction mixture to an esterification, an ester-interchange reaction, or glycolysation, to yield a pre-polymer;
   (c) charging a chain extender, in a proportion of about 0.05 wt. % to about 2.0 wt. % with respect to a total mass of the reaction mixture, in the reaction mixture during (b) in at least one portion or continuously at a controlled dosing rate when an intrinsic viscosity of the reaction mixture is <0.20;
   (d) subjecting the pre-polymer to polycondensation at a temperature in the range of about 270° C. to about 305° C. under a pressure of less than 10 mb, to obtain amorphous chips such that an intrinsic viscosity of the amorphous chips ranges from 0.40 to 0.80;
   (e) crystallizing the amorphous chips at a temperature ranging from about 110° C.-170° C., to obtain crystallized chips with a crystallinity of more than 30%; and
   (f) processing the crystallized chips in a solid state polymerizer at a temperature in the range of about 190° C. to about 225° C. until an intrinsic viscosity of processed chips ranging from about 0.70 to about 2.0 is achieved, to obtain an EBM grade co-polyester resin composition.

2. The process of claim 1, wherein:
   the diol is monoethylene glycol, diethylene glycol, triethylene glycol, butanediol, propanediol, a polyethylene glycol, or any mixture thereof with a weight average molecular weight of up to 4000 g/mol; and
   a proportion of polyethylene glycol in the reaction mixture is up to 5% with respect to the total mass of the reaction mixture.

3. The process of claim 1, wherein the polyester-forming material is the diol-dicarboxylic acid pair.

4. The process of claim 3, wherein the di-carboxylic acid is purified terephthalic acid, isophthalic acid, adipic acid, sebacic acid, or any mixture thereof.

5. The process of claim 4, wherein the di-carboxylic acid is purified terephthalic acid.

6. The process of claim 1, wherein:
   the polyester-forming material is the diol-dicarboxylic acid pan; and
   the esterification is carried out at a temperature ranging from about 240 to about 280° C. under a pressure up to about 4.5 bar for a period of about 2.0 to 2.5 hrs.

7. The process of claim 3, wherein a molar ratio of the diol to the di-carboxylic acid in the diol-dicarboxylic acid pair ranges from about 1.04 to about 1.45.

8. The process of claim 1, wherein:
   the polyester-forming material is the diol-dicarboxylic ester pair; and
   the dicarboxylic ester is dimethyl terephthalate.

9. The process of claim 8, wherein a molar ratio of the diol to the dimethyl terephthalate in the diol-dicarboxylic ester pair ranges from about 2 to about 2.25.

10. The process of claim 8, wherein the ester-interchange reaction is carried out at a temperature ranging from about 140° C. to about 270° C. under an absolute pressure of about 200 mbar to about 1200 mbar.

11. The process of claim 1, wherein the co-monomer is isophthalic acid, neopentyl glycol, adipic acid, 2,6 naphthalene dicarboxylate (NDC), 2,6-naphthalene dicarboxylic acid (NDA), dimethyl isophthalate, pentaerythritol, glycerol, or any mixture thereof.

12. The process of claim 1, wherein:
the polyester-forming material is the diol-dicarboxylic ester pair; and
the co-monomer is dimethyl isophthalate.

13. The process of claim 1, wherein a proportion of the co-monomer in the reaction mixture ranges from about 4% to about 20% with respect to the total mass of the reaction mixture.

14. The process of claim 1, wherein:
the polyester forming material is the diol-recycled PET pair; and
the glycolysation is carried out at a temperature ranging from about 190 to about 260° C. under the pressure up to about 3.5 bar for a period of about 40 to 60 minutes.

15. The process of claim 1, wherein the additive comprises a poly-condensation catalyst or an ester-interchange catalyst.

16. The process of claim 1, wherein the additive comprises at least one poly-condensation catalyst selected from the group consisting of an antimony compound, a germanium compound, a titanium compound, a tin compound, and an aluminum compound.

17. The process of claim 1, wherein the additive comprises is at least one ester-interchange catalyst selected from the group consisting of zinc acetate and manganese acetate.

18. The process of claim 1, wherein the additive comprises a color toner, which is cobalt acetate, a polymer soluble dye, or a mixture thereof.

19. The process of claim 1, wherein the chain extender is a copolymer comprising at least two epoxy groups and having a number average molecular weight, $M_n$, in the range from 1000 to 10000.

20. The process of claim 19, wherein the copolymer has an epoxy equivalent weight in the range of 150 to 500.

21. The process of claim 1, wherein the chain extender is charged in the form of a pre-mix comprising the chain extender and a carrier selected from the group consisting of a powdered PET and a powdered Co-PET.

22. The process of claim 1, wherein the reaction mixture further comprises a stabilizer, which is carboxy ethyl dimethyl phosphate, phosphoric acid, or a mixture thereof.

23. The process of claim 1, further comprising adjusting a grade of the co-polyester resin by varying the proportion of the chain extender added in the reaction mixture.

24. The process of claim 1, wherein the co-polyester resin composition comprises acetaldehyde in an amount less than 1 ppm.

25. The process of claim 1, wherein the amorphous chips are crystallized in a tumble dryer, a rotary crystallizer, or a high rpm agitated reactor.

26. The process of claim 1, wherein the processing (f) is carried out in a batch reactor or a continuous reactor.

27. The process of claim 1, wherein the polyester forming material is the diol-recycled PET pair, and the PET is post consumer recycled PET, post industrial recycled PET, or a mixture thereof.

28. The process of claim 1, wherein:
an intrinsic viscosity of the EBM-grade co-polyester resin composition ranges from about 0.80 to about 1.40; and
the EMB-grade co-polyester resin composition is gel free and transparent.

29. An extrusion-blow-moldable co-polyester resin composition having intrinsic viscosity in the range of about 0.70 to about 2.0, and comprising a chain extender in a proportion of about 0.05% to about 2.0% with respect to a mass of the resin, which is added before polymerization in at least one portion or in continuous manner at controlled dosing rate, when the intrinsic viscosity of a reaction mixture comprising the chain extender is <0.20.

30. The co-polyester resin composition of claim 29, wherein:
a melt strength of the co-polyester resin composition at a temperature of 260° C. to 275° C. ranges from about 0.05 N to 0.5; and
a haul-off speed of the co-polyester resin composition during extrusion-blow-molding ranges from of about 20 m/min to 180 m/min.

31. The co-polyester resin composition of claim 29, having an L* transmission value >92.0%, a* color value of between −1.0±0.5, and b* color value of between 0.3±0.5, as classified by the Hunter L*a*b* color space.

32. An extrusion-blow-molded shaped article optionally comprising an integral hollow handle formed from the co-polyester resin composition of claim 29, wherein the shaped article is a parison, a container, a film, a tube, or any mixture thereof, and wherein the article has a volume in the range of about 20 ml to about 25 liters.

33. An extrusion-blow-molded shaped article formed from the co-polyester resin composition of claim 29, wherein the article is transparent.

* * * * *